US012316044B2

(12) United States Patent
Toyoda

(10) Patent No.: US 12,316,044 B2
(45) Date of Patent: May 27, 2025

(54) ELECTRICAL CONNECTOR WITH PRESS-FIT COVER

(71) Applicant: Tyco Electronics Japan G.K., Kawasaki (JP)

(72) Inventor: Keisuke Toyoda, Shizuoka (JP)

(73) Assignee: TE Connectivity Japan G.K., Kawasaki (JP)

( * ) Notice: Subject to any disclaimer, the term of this patent is extended or adjusted under 35 U.S.C. 154(b) by 255 days.

(21) Appl. No.: 17/746,258

(22) Filed: May 17, 2022

(65) Prior Publication Data

US 2022/0376427 A1 Nov. 24, 2022

(30) Foreign Application Priority Data

May 18, 2021 (JP) ................................ 2021-083985

(51) Int. Cl.
*H01R 13/502* (2006.01)

(52) U.S. Cl.
CPC .................................. *H01R 13/502* (2013.01)

(58) Field of Classification Search
CPC .................................................... H01R 13/502
USPC .......................................................... 439/701
See application file for complete search history.

(56) References Cited

U.S. PATENT DOCUMENTS 5,399,103 A * 3/1995 Kuboshima ......... H01M 50/517 439/504
8,529,295 B2 * 9/2013 Sasaki .................. H01R 13/502 439/660
8,956,192 B2 * 2/2015 Eckel ..................... H01R 43/20 439/686
9,837,756 B2 * 12/2017 Toyoda ................ H01R 13/567
10,205,264 B2 * 2/2019 Washio .................. H01R 31/08
10,283,903 B2 * 5/2019 Yamanaka ........... H01R 13/648
10,547,125 B2 * 1/2020 Tillotson, Jr. ....... B60R 16/0207
2018/0375247 A1 12/2018 Nakamura et al.
2021/0119378 A1 4/2021 Nagasaka et al.
2023/0114568 A1 * 4/2023 Carter .................... B60J 7/0573 296/100.05

FOREIGN PATENT DOCUMENTS

JP 2019009007 A 1/2019
JP 202164568 A 4/2021

OTHER PUBLICATIONS

TE Connectivity, Instruction Sheet 411-78084, Installation manual, Sep. 19, 2023, 39 pages.
Japanese Office Action dated Jan. 14, 2025 with English translation, corresponding with Application No. 2021-083985, 7 pages.

* cited by examiner

*Primary Examiner* — Abdullah A Riyami
*Assistant Examiner* — Vladimir Imas
(74) *Attorney, Agent, or Firm* — Barley Snyder

(57) ABSTRACT

A connector includes an outer housing, a wire cover assembled to the outer housing, a first press-fit engaging portion that engages the outer housing and the wire cover with each other by clamping in a first clamping direction, and a second press-fit engaging portion that engages the outer housing and the wire cover with each other by clamping in a second clamping direction. The second clamping direction intersects the first clamping direction.

20 Claims, 15 Drawing Sheets

ELECTRICAL CONNECTOR WITH PRESS-FIT COVER

CROSS-REFERENCE TO RELATED APPLICATIONS

This application claims the benefit of the filing date under 35 U.S.C. § 119(a)-(d) of Japanese Patent Application No. 2021-083985, filed on May 18, 2021.

FIELD OF THE INVENTION

The present disclosure relates to connectors and, more particularly, relates to a connector that is used in an electrical connection.

BACKGROUND

Tyco Electronics Installation Manual 411-78084-1 discloses a connector including an outer housing into which a plurality of electric wires are led out and a wire cover covering lead-out surfaces of the electric wires while having a space between the outer housing and the wire cover. In such a connector, the wire cover is attached to the outer housing by hooking, on a receiving portion of the outer housing, a lock portion of the wire cover situated on the periphery of one side surface of the wire cover and then catching, on a lock receiving portion of the outer housing, a lock portion of the wire cover situated on the periphery of the other side surface of the wire cover.

A possible example of an application of such a connector having a wire cover is the positioning of the connector in a place to which vibrations are transmitted. In such positioning, vibrations transmitted to the connector cause backlash to occur between the wire cover and the outer housing, with the result that the wire cover may become uncaught on the outer housing. Furthermore, the transmission of vibrations from the electric wires to terminal contact portions of the connector via the wire cover may impair electrical continuity. For example, in the connector described in Tyco Electronics Installation Manual 411-78084-1, the wire cover is attached to the outer housing by catching the lock portion of the wire cover on the lock receiving portion of the outer housing in such a way that the lock portion of the wire cover is hooked on the lock receiving portion of the outer housing. However, in such a structure, vibrations applied from a plurality of directions cause backlash to occur between the wire cover and the outer housing, with the result that detachment of the wire cover from the outer housing and/or contact failures of the terminal contact portions may occur.

SUMMARY

A connector includes an outer housing, a wire cover assembled to the outer housing, a first press-fit engaging portion that engages the outer housing and the wire cover with each other by clamping in a first clamping direction, and a second press-fit engaging portion that engages the outer housing and the wire cover with each other by clamping in a second clamping direction. The second clamping direction intersects the first clamping direction.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
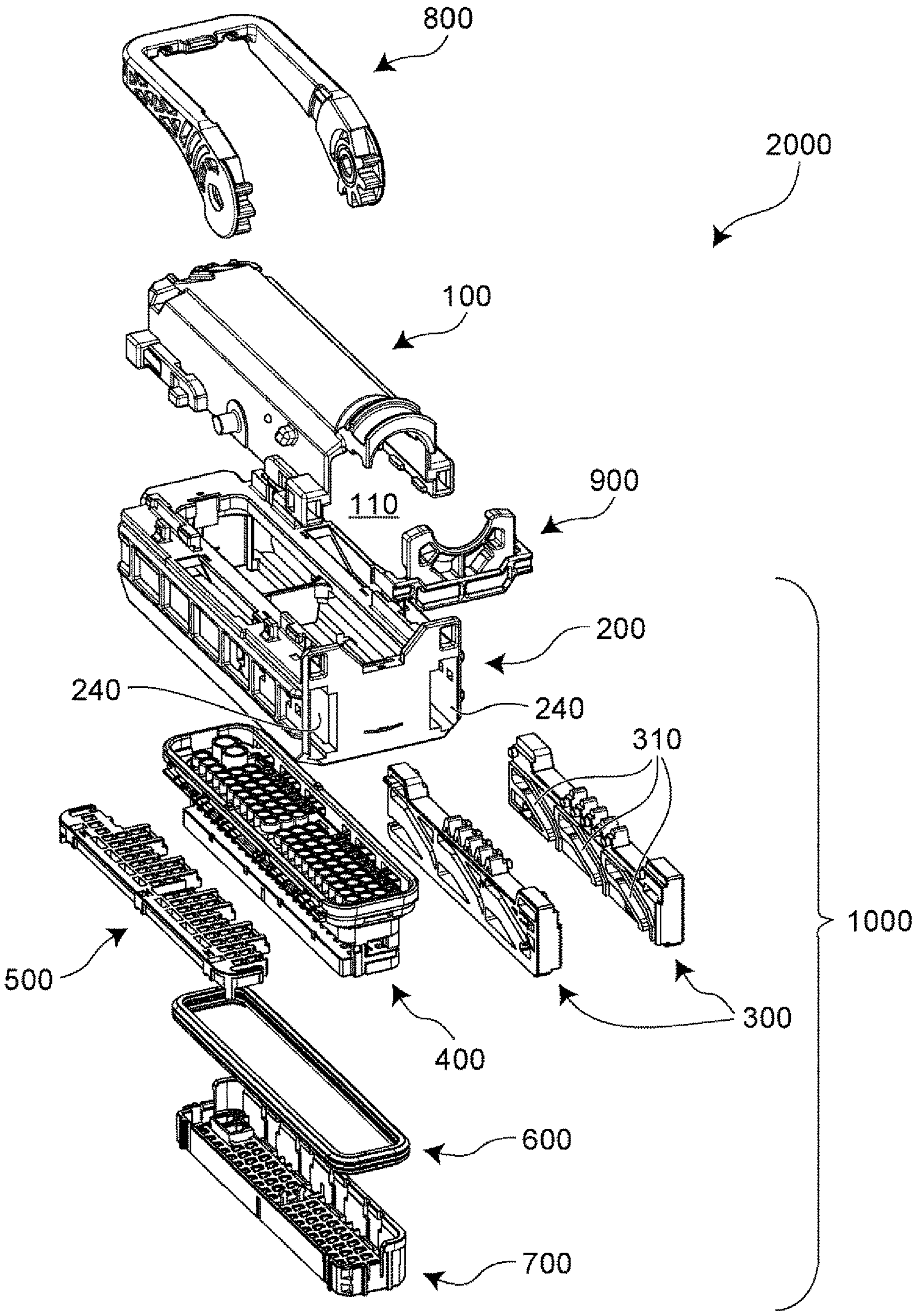
FIG. 1 is an exploded isometric view schematically showing a connector of the present disclosure.

The following describes in more detail a connector according to an embodiment of the present disclosure with reference to the drawings. Various elements in the drawings are merely schematically and illustratively shown for understanding of the present disclosure and may differ in outward appearance and/or dimensional ratio from actual ones.

Furthermore, the following description uses, on an as-needed basis, terms that indicate particular directions or positions. However, the use of these terms is intended to facilitate understanding of the invention with reference to the drawings, and the meanings of these terms are not intended to limit the technical scope of the present disclosure. Further, components given identical reference signs throughout a plurality of drawings refer to identical or equivalent components.

First, for grasping of an overall structure of a connector of the present disclosure, the following gives a brief overview of a connector of the present disclosure with reference to the drawings.

Figure 2:
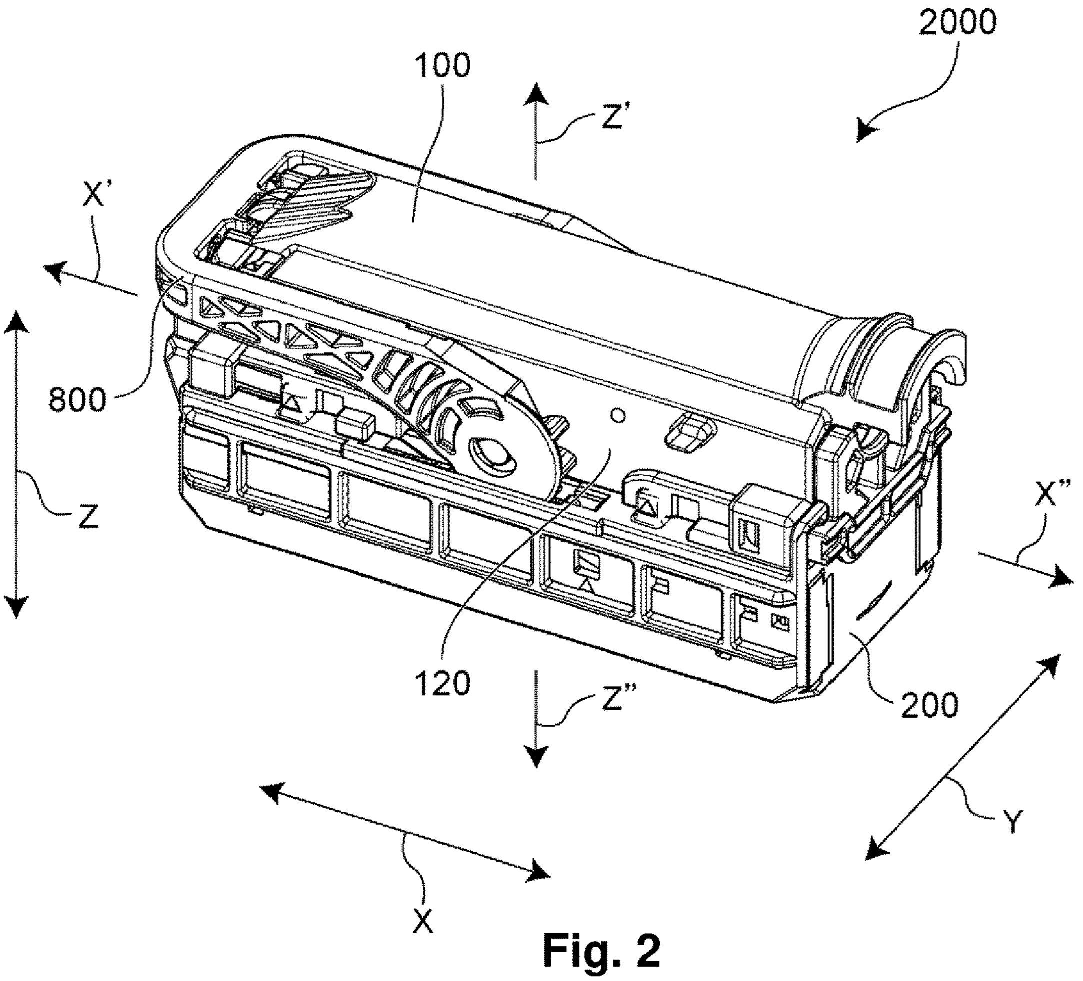
FIG. 2 is an isometric view schematically showing the connector shown in FIG. 1.

FIG. 1 is an exploded isometric view schematically showing a connector of the present disclosure. FIG. 2 is an isometric view schematically showing the connector of the present disclosure after assembling. The connector 2000 includes, as main constituent elements, a housing 1000, a wire cover 100, and an operating lever 800 rotatably attached to the wire cover 100.

The housing 1000 supports a plurality of terminals connected separately to one end of each of a plurality of electric wires of a mating connector that is mated with the present connector 2000. The wire cover 100 is attached to the housing 1000 in such a way as to cover the plurality of wires connected to the plurality of terminals.

Figure 3A:
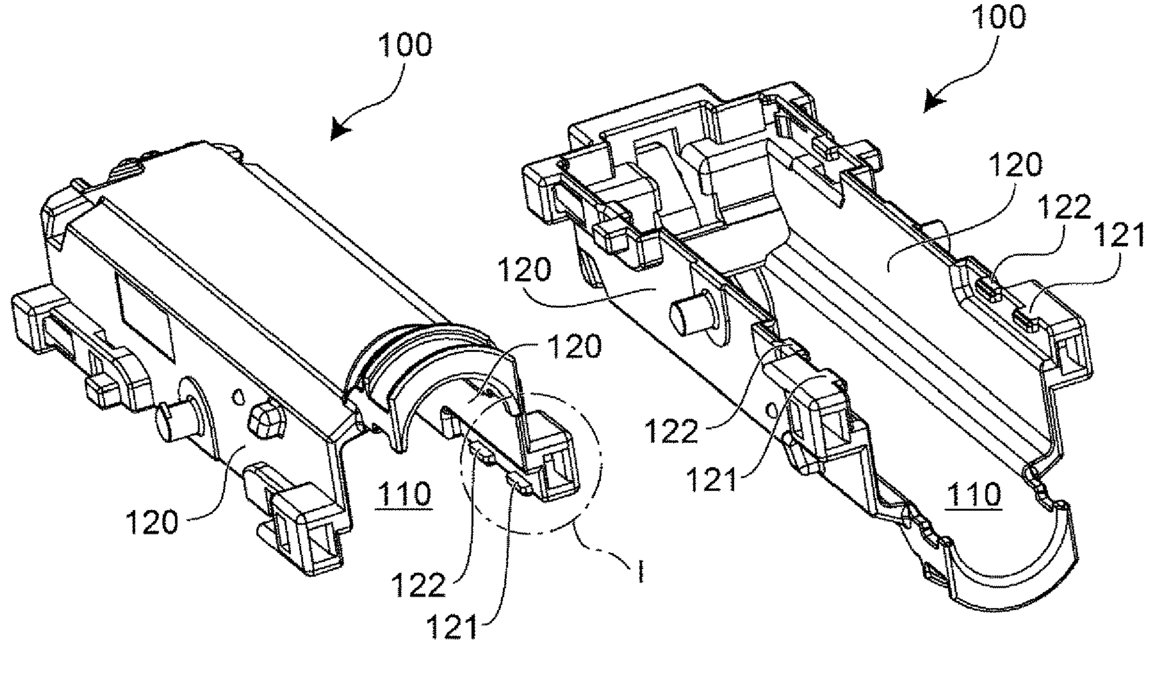
FIG. 3A is an isometric view schematically showing a wire cover of the connector of the present disclosure.
Figure 3B:
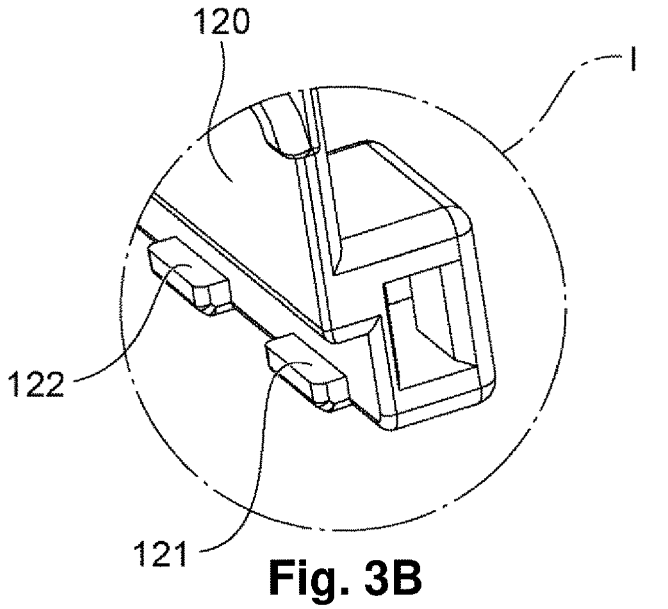
FIG. 3B is a partially-enlarged view of a portion I of the wire cover shown in FIG. 3A.

FIG. 3A illustrates isometric views schematically showing the wire cover 100 of the connector 2000 as seen from above and below. The wire cover 100 has an opening 110 provided at one end thereof in a direction parallel with the long sides of the connector 2000. The plurality of electric wires covered with the wire cover 100 are neatly drawn toward the opening 110 and extend out of the connector 2000 through the opening 110. Furthermore, the wire cover 100 has a press-fit protrusion 121 and a locating protrusion 122 that project either outward or inward from a side wall 120 (see FIG. 3B).

Note here that, for convenience of explanation, the "directions" used in the present specification and drawings are defined as follows. As shown in FIG. 2, directions equivalent to directions parallel with the long sides of the connector 2000 are referred to as "front-back directions X" in the present specification and drawings. Of the "front-back directions X", a direction in which the opening 110 (see FIG. 1) is formed in the wire cover 100 is referred to as "backward direction X"", and the opposite direction is referred to as "frontward direction X'". Note here that the "backward direction X"" substantially means a direction in which the electric wires are led out through the opening 110 of the wire cover 100, and is equivalent to an "electric wire lead-out direction". Further, directions equivalent to upward and downward directions in the drawings are referred to as "up-down directions Z". Of the "up-down directions Z", a vertically downward direction (i.e. a direction of gravitational force) is referred to as "downward direction Z"", and the opposite direction is referred to as "upward direction Z'". Furthermore, directions equivalent to direction parallel with the short sides of the connector 2000 are referred to as "right-left directions Y". In an embodiment, the "front-back directions X", the "up-down directions Z", and the "right-left directions Y" are orthogonal to one another.

It should be noted that the term "top view" as used herein refers to a state in which a physical object is seen from above or below along the up-down directions Z. Further, the term "cross-sectional view" as used herein refers to a state in which a physical object is seen along a direction substantially perpendicular to the up-down directions Z, i.e. along the right-left directions Y.

Figure 4:
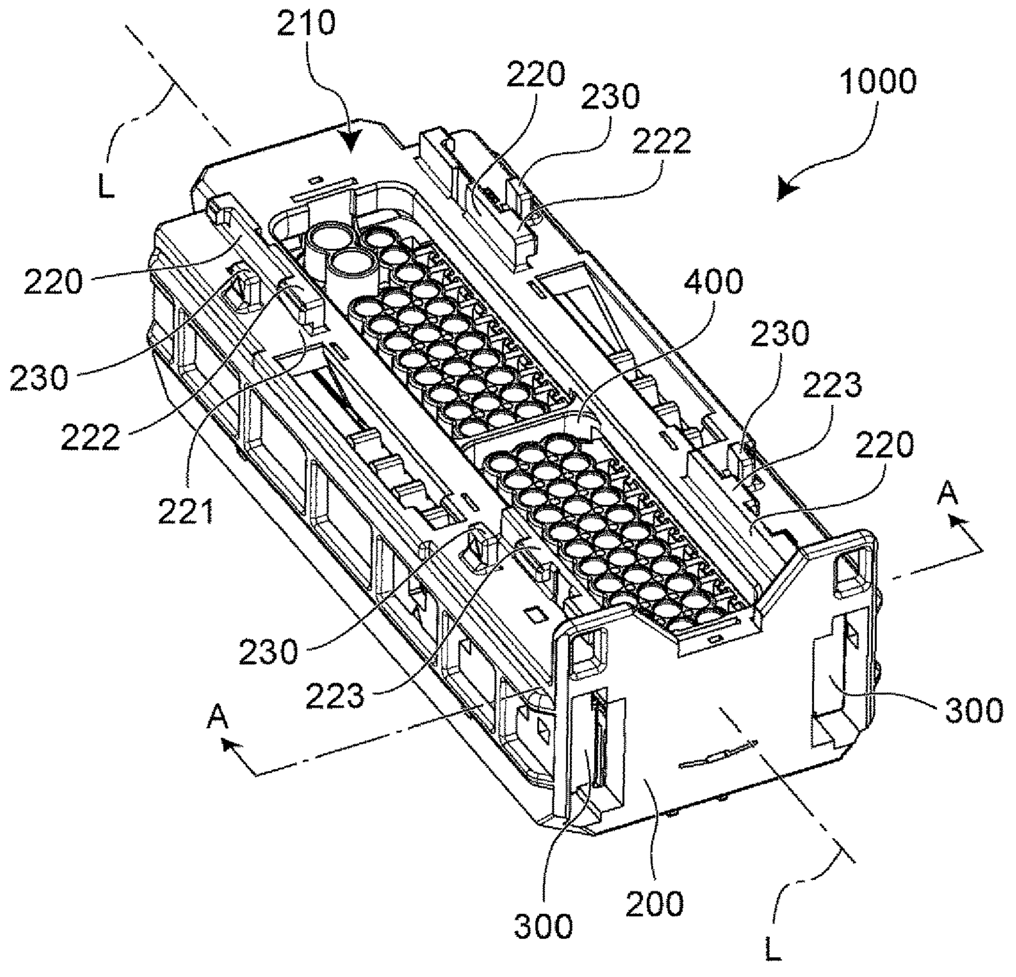
FIG. 4 is an isometric view schematically showing a housing of the connector of the present disclosure.
Figure 5A:
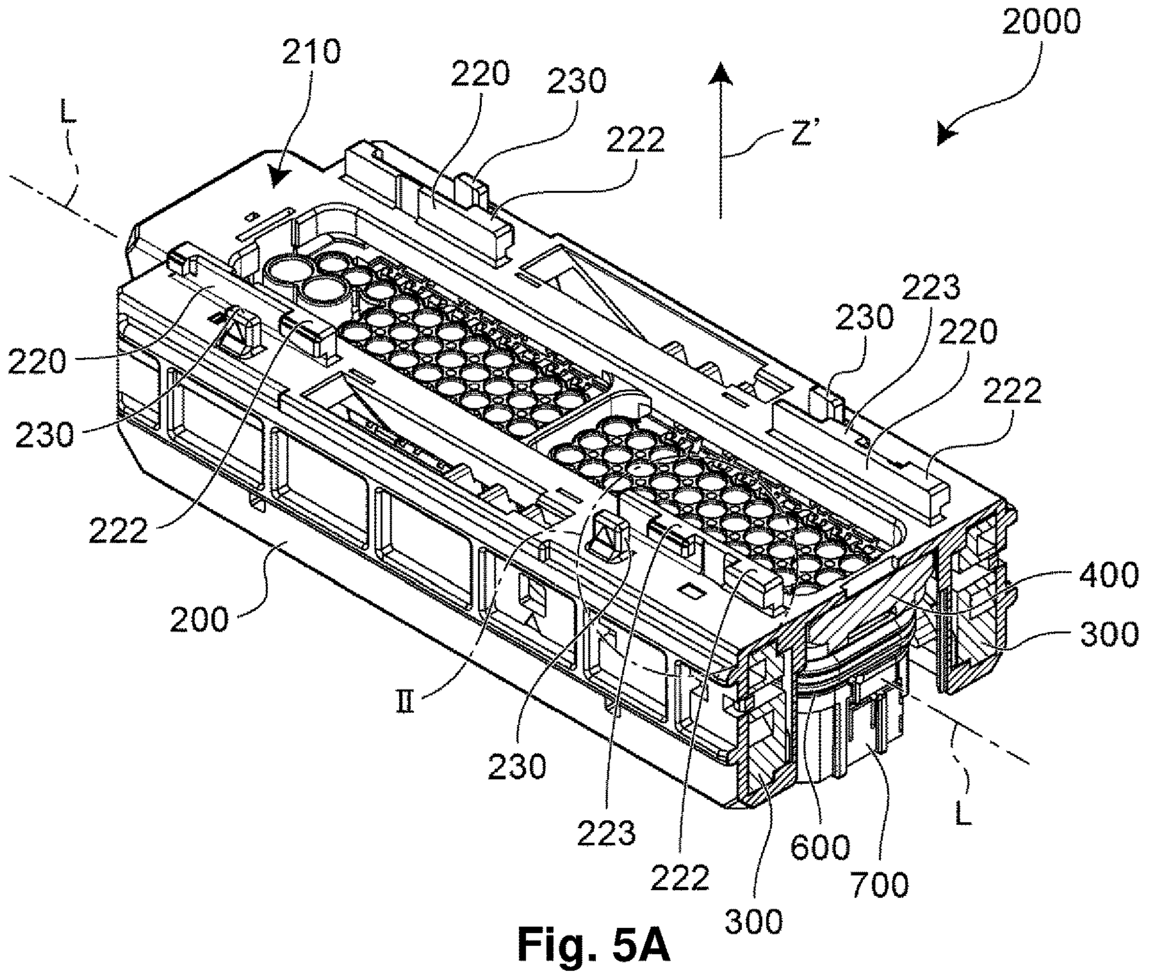
FIG. 5A is an isometric cross-sectional view of the connector as taken along arrow A-A in FIG. 4.

As shown in FIG. 1, the housing 1000 of the connector 2000 has an outer housing 200, an inner housing 400, and a front housing 700. FIG. 4 is an isometric view schematically showing the housing 1000 of the connector of the present disclosure, and FIG. 5A is an isometric cross sectional view of the housing 1000 with removal of a posterior region shown in FIG. 4. As illustrated, the outer housing 200 may be assembled in such a way as to cover the inner housing 400 and the front housing 700.

Figure 5B:
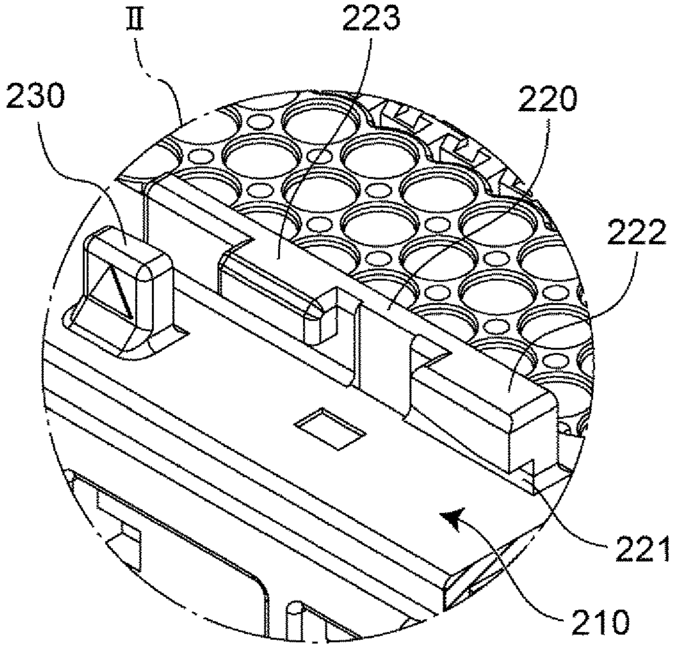
FIG. 5B is a partially-enlarged view of a portion II of the wire cover shown in FIG. 5A.

As shown in FIG. 5B, the outer housing 200 has a raised portion 220, a press-fit groove 221 provided in the raised portion 220, and a projecting portion 230. The raised portion 220 may be formed along a direction parallel with the long sides of the connector 2000 in such a way as to project in the upward direction Z' from an upper surface 210 of the outer housing 200. The press-fit groove 221 is a groove formed along a direction parallel with the long sides of the connector 2000 in a side surface of the raised portion 220 that faces the wire cover 100. Further, the projecting portion 230 is formed in such a way as to project in the upward direction Z' from the upper surface 210 of the outer housing 200.

Furthermore, as shown in FIG. 1, the outer housing 200 has grooves 240, provided separately in each of two side walls extending in a direction parallel with the long sides, that pass completely through the side walls along the front-back directions X. As shown in FIG. 4, cam elements 300 are accommodated separately in each of the grooves 240 in such a way as to be able to slide in the front-back directions X.

The cam elements 300 of the connector 2000 of the present disclosure may be substantially in the shape of plates (see FIG. 1). Each of the cam elements 300 has a plurality of cam grooves 310, provided in a side surface thereof, that correspond to cam pins of the mating connector.

Further, as shown in FIG. 2, the operating lever 800 of the connector 2000 extends in a curve astride the wire cover 100 in the right-left directions Y, and is rotatably pivoted on both sides of the wire cover 100. This rotating operation causes the operating lever 800 to help the present connector 2000 and the mating connector to be mated with each other. Specifically, the operating lever 800 may be assembled so that the rotating operation brings the cam elements 300, which are in the grooves 240 of the outer housing 200, into slide movement. This slide movement of the cam elements 300 causes the cam pins of the mating connector to be drawn into the cam grooves 310 of the cam elements 300, so that the present connector and the mating connector become completely mated with each other. In this way, the operating lever 800 and the cam elements 300 act as a force-multiplication mechanism in mating the connector 2000 and the mating connector with each other. In other words, the operating lever 800 and the cam elements 300 make it possible to mate the connector 2000 with the mating connector with a smaller force.

Further, the connector 2000 of the present disclosure may include a retainer 500 that is plugged into the inner housing 400 (see FIG. 1). The retainer 500 may locate and fix terminals of the mating connector in the inner housing 400.

Furthermore, the connector 2000 may have a seal material 600 for waterproofing purposes, as shown in FIG. 1. In the present disclosure, the connector 2000 may include the seal material 600 on an inner surface and/or an outer periphery of the inner housing 400. The seal material 600 may cut off water between the inner housing 400 and the mating connector.

Figure 6A:
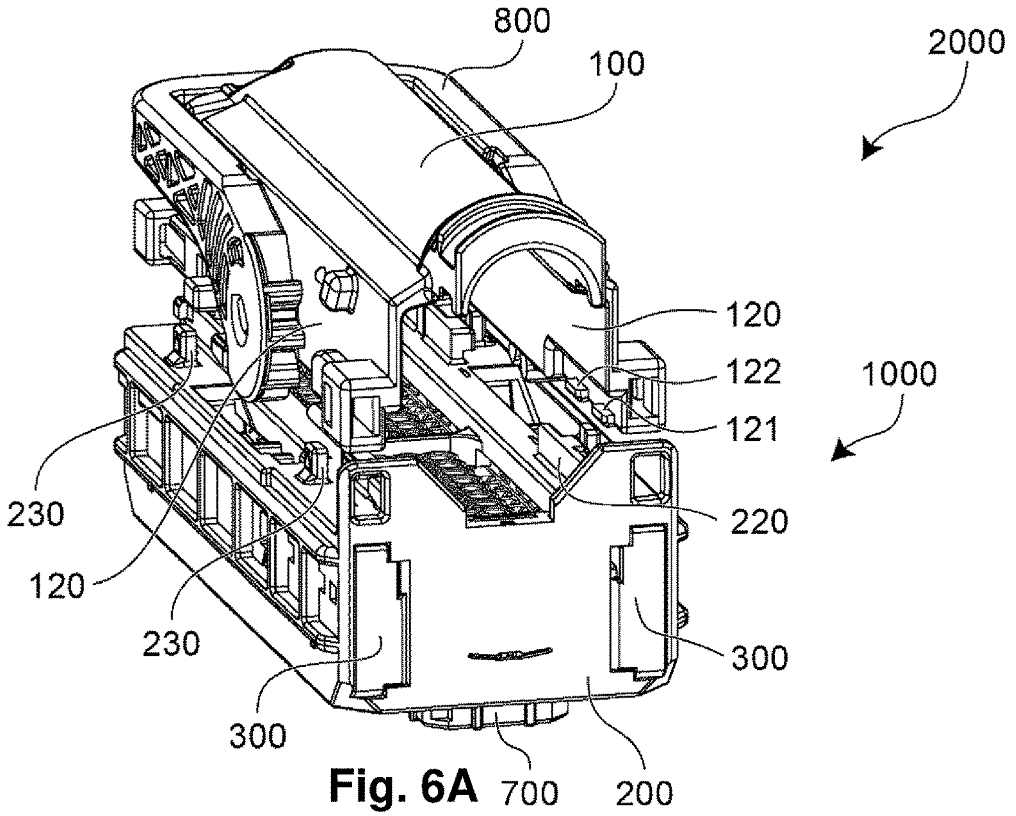
FIG. 6A is an isometric view schematically showing the connector of the present disclosure before assembling of the wire cover.
Figure 6B:
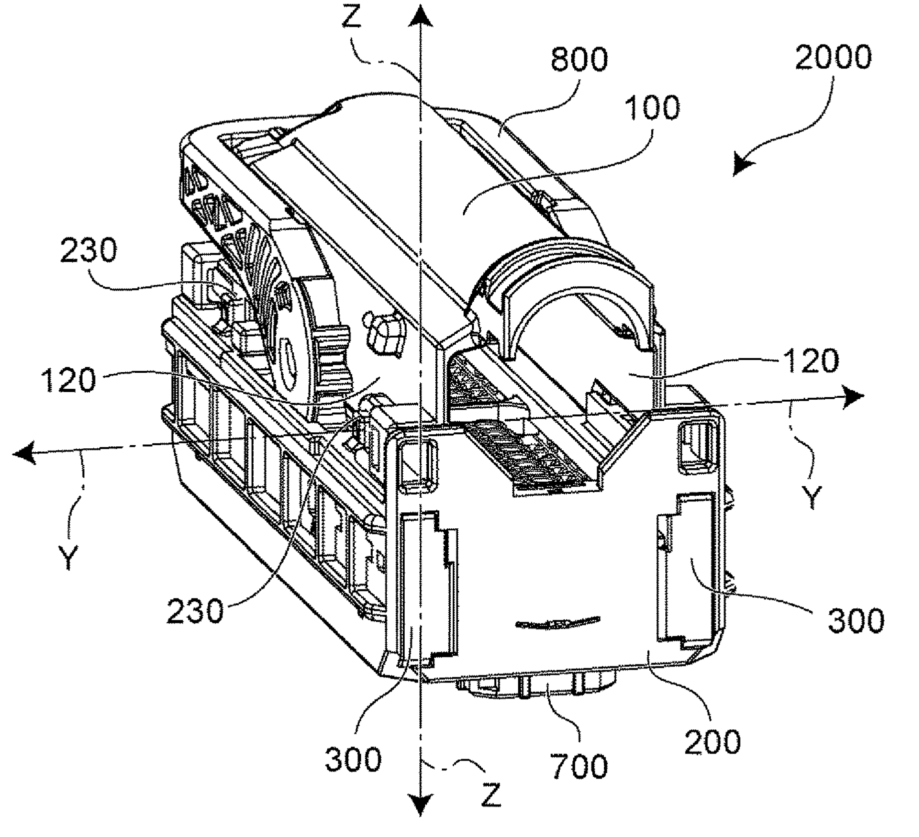
FIG. 6B is an isometric view schematically showing the connector of the present disclosure after assembling of the wire cover.

In the connector 2000, as shown in FIGS. 6A and 6B, after the plurality of terminals of the mating connector have been plugged into the housing 1000, the wire cover 100, to which the operating lever 800 is attached, is assembled to the outer housing 200. The connector 2000 is characterized in a structure of assembling of the wire cover 100 to the outer housing 200. The following describes a structure of assembling of the wire cover 100 and the outer housing 200 of the connector 2000.

The connector 2000 has a press-fit engaging portion in which the wire cover 100 and the outer housing 200 are engaged with each other by clamping. The press-fit engaging portion restricts a relative movement of the wire cover 100 and/or the outer housing 200 in a clamping direction. This means that in the press-fit engaging portion, the wire cover 100 and the outer housing 200 are fixed by pressure applied in the clamping direction. In other words, the connector of the present disclosure includes a press-fit engaging portion in which the wire cover 100 and the outer housing 200 engage with each other while interfering with each other, whereby a relative displacement of the wire cover 100 and/or the outer housing 200 in a direction substantially perpendicular to surfaces that engage with each other is suppressed. This means that the press-fit engaging portion may prevent backlash from occurring in the clamping direction in which the press-fit engaging portion is subject to pressure. Accordingly, the connector 2000 can be construed as including a wire cover 100 and an outer housing 200 that have a vibration suppression structure.

The connector 2000 has two types of press-fit engaging portion whose clamping directions intersect each other. That is, the connector 2000 has a first press-fit engaging portion and a second press-fit engaging portion that engage the outer housing 200 and the wire cover 100 with each other, and a first clamping direction of the first press-fit engaging portion and a second clamping direction of the second press-fit engaging portion intersect each other. By the wire cover 100 and the outer housing 200 being assembled to each other by the two types of press-fit engaging portion whose clamping directions intersect each other, relative displacements of the wire cover 100 and the outer housing 200 in a plurality of directions may be more suitably restricted. Accordingly, in the connector 2000, backlash caused by vibrations applied from a plurality of directions is more suitably suppressed, so that the occurrence of detachment of the wire cover 100 from the outer housing 200 and/or contact failures of the terminal contact portions may be prevented.

In an embodiment, the respective clamping directions of the first press-fit engaging portion and the second press-fit engaging portion have such a relationship as to be orthogonal to each other. In other words, the first clamping direction of the first press-fit engaging portion and the second clamping direction of the second press-fit engaging portion substantially perpendicularly intersect each other. Since the clamping directions are orthogonal to each other, relative displacements caused by vibrations applied from a plurality of directions can be more effectively suppressed. The phrases "orthogonal to each other" and "substantially perpendicularly intersect" here do not need to mean being completely "orthogonal" or "perpendicular", but encompass aspects with slight drifts from those standards (in which for example, an angle formed by the first clamping direction and the second clamping direction falls within a range of 90 degrees±20 degrees, e.g. a range of 90 degrees±10 degrees). For example, as shown in FIG. 6B, the connector of the present disclosure may have two types of press-fit engaging portion consisting of a first press-fit engaging portion ZI (see FIG. 10B) whose first clamping direction is parallel with the up-down directions Z and a second press-fit engaging portion YI (see FIG. 9B) whose second clamping direction is parallel with the right-left directions Y. The following describes the structure of the press-fit engaging portion.

Figure 7:
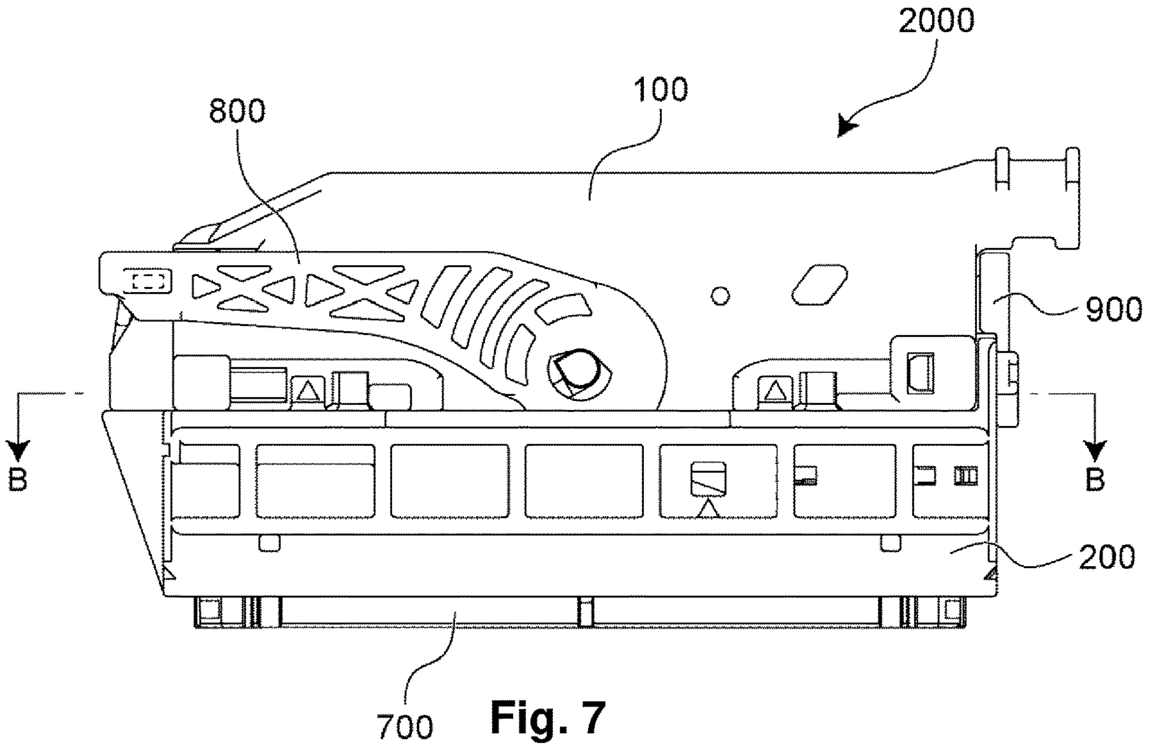
FIG. 7 is a side view schematically showing the connector of the present disclosure.
Figure 10A:
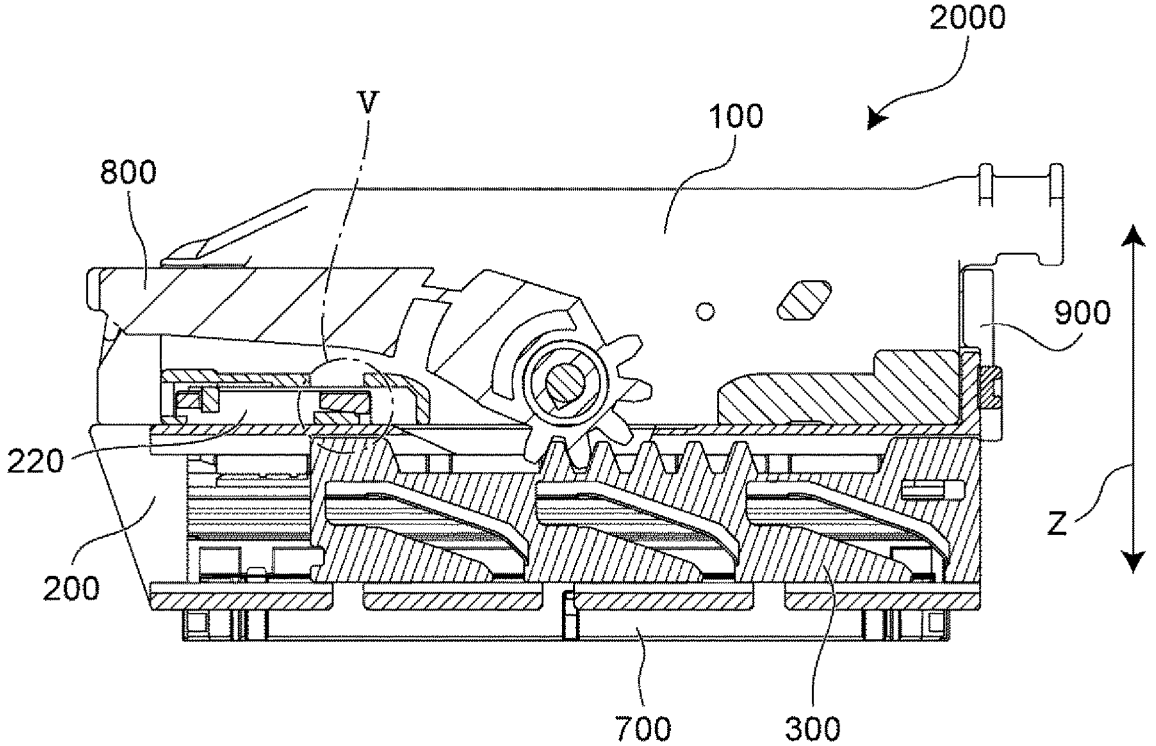
FIG. 10A is a side cross-sectional view of the connector as taken along arrow C-C in FIG. 9A.
Figure 10B:
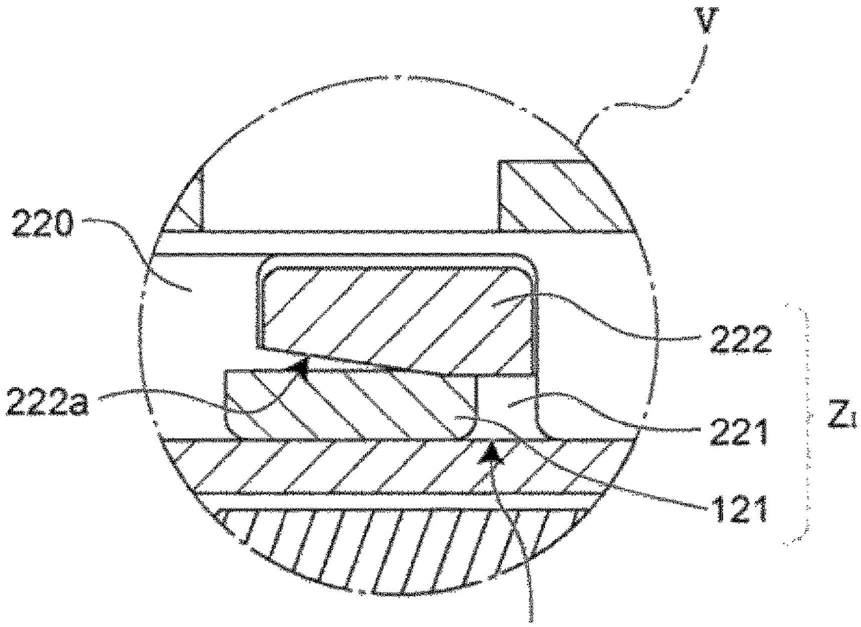
FIG. 10B is a partially-enlarged view showing a portion V of the connector shown in FIG. 10A.

FIG. 10A is a side cross sectional view of the connector 2000 of the present disclosure shown in FIG. 7. Furthermore, FIG. 10B schematically illustrates an enlarged view of the first press-fit engaging portion ZI of the connector of FIG. 10A. As illustrated, the wire cover 100 has the press-fit protrusion 121 on the side wall 120, and the outer housing 200 has the press-fit groove 221 provided in the raised portion 220. In the first press-fit engaging portion ZI, the press-fit protrusion 121 and the press-fit groove 221 engage with each other, whereby the wire cover 100 is assembled to the outer housing 200. Accordingly, the press-fit engagement between the outer housing 200 and the wire cover 100 in the first clamping direction may be carried out by the press-fit protrusion 121 of the wire cover 100 being assembled into the press-fit groove 221 of the outer housing. In other words, the press-fit protrusion 121 of the wire cover may be engaged with the press-fit groove 221 of the outer housing 200 by clamping. This means that the press-fit protrusion 121 of the wire cover is fixed under pressure applied in the first clamping direction, i.e. the up-down directions Z, by the press-fit groove 221 of the outer housing. Such an assembling structure makes it possible to more suitably restrict relative displacements of the outer housing 200 and the wire cover 100 in the up-down directions Z.

Figure 11A:
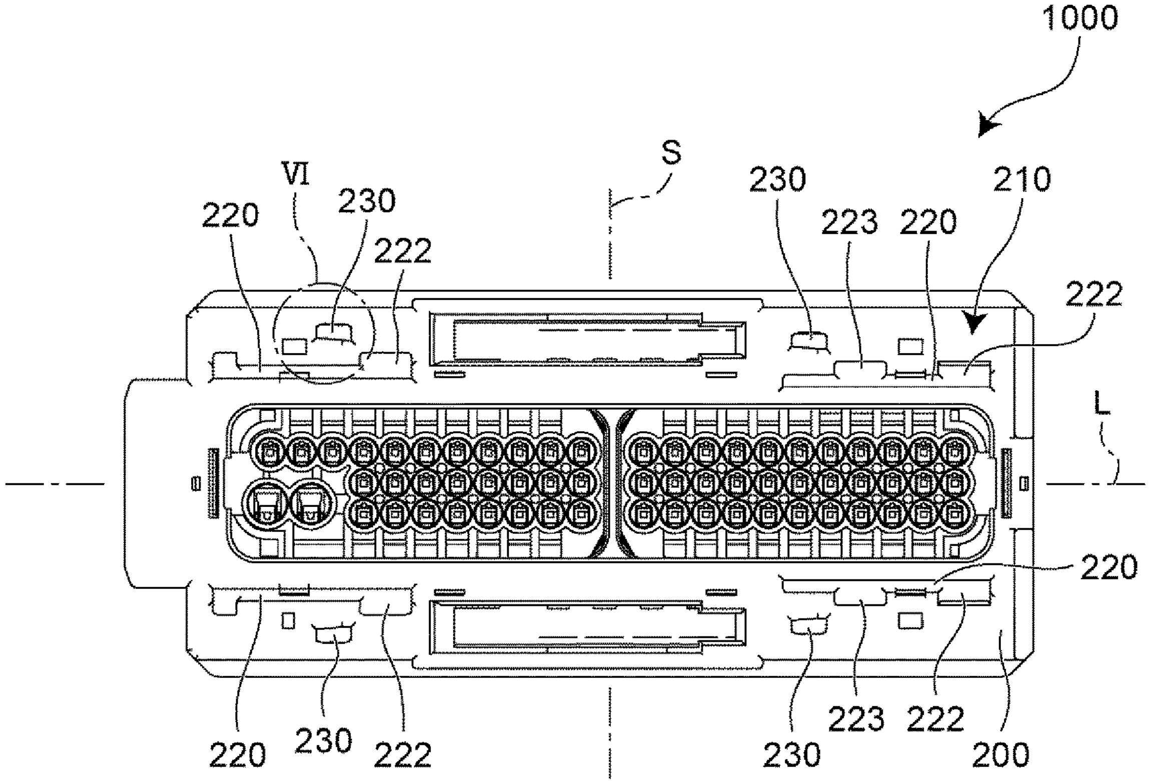
FIG. 11A is a top view schematically showing the housing of the connector of the present disclosure.

FIG. 11A is a top view of the housing 1000 of the connector of the present disclosure. As illustrated, the raised portion 220 of the connector 2000 is provided on a peripheral portion of the upper surface 210 of the outer housing 200 along a direction parallel with the long sides of the outer housing 200. This structure causes the side wall 120 of the wire cover 100 to be supported by the raised portion 220, so that backlash between the outer housing 200 and the wire cover 100 is more suitably suppressed.

Figure 12A:
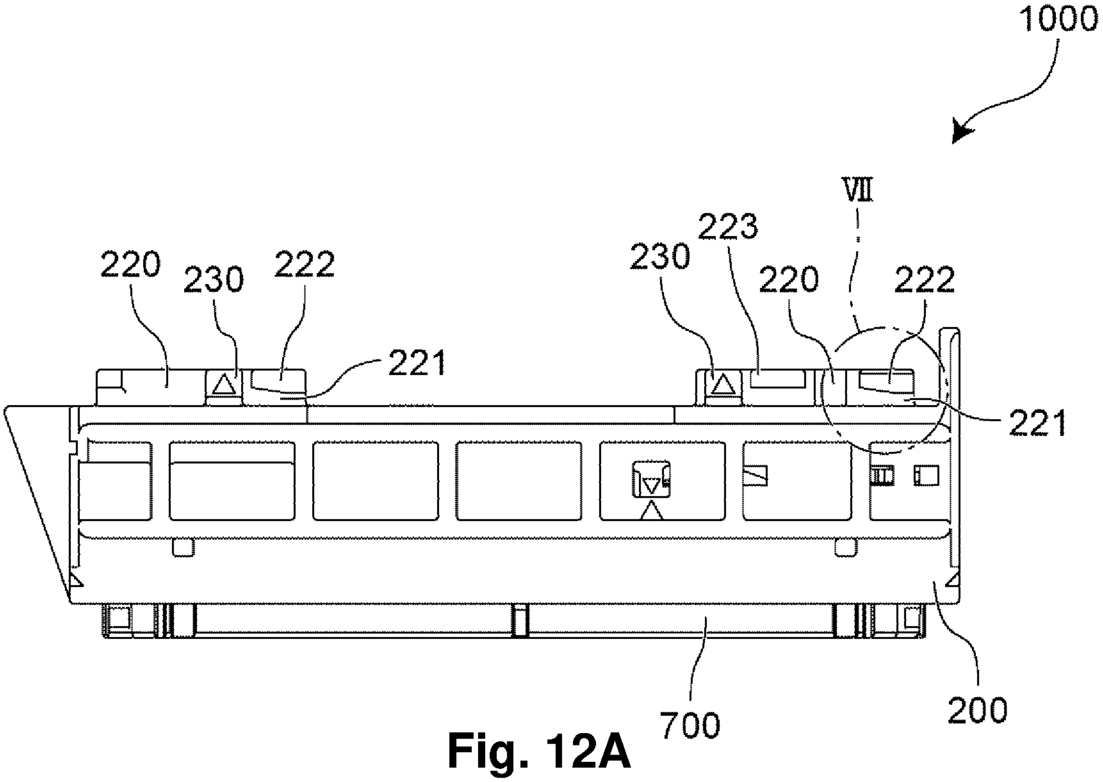
FIG. 12A is a side view schematically showing the housing of the connector of the present disclosure.
Figure 12B:
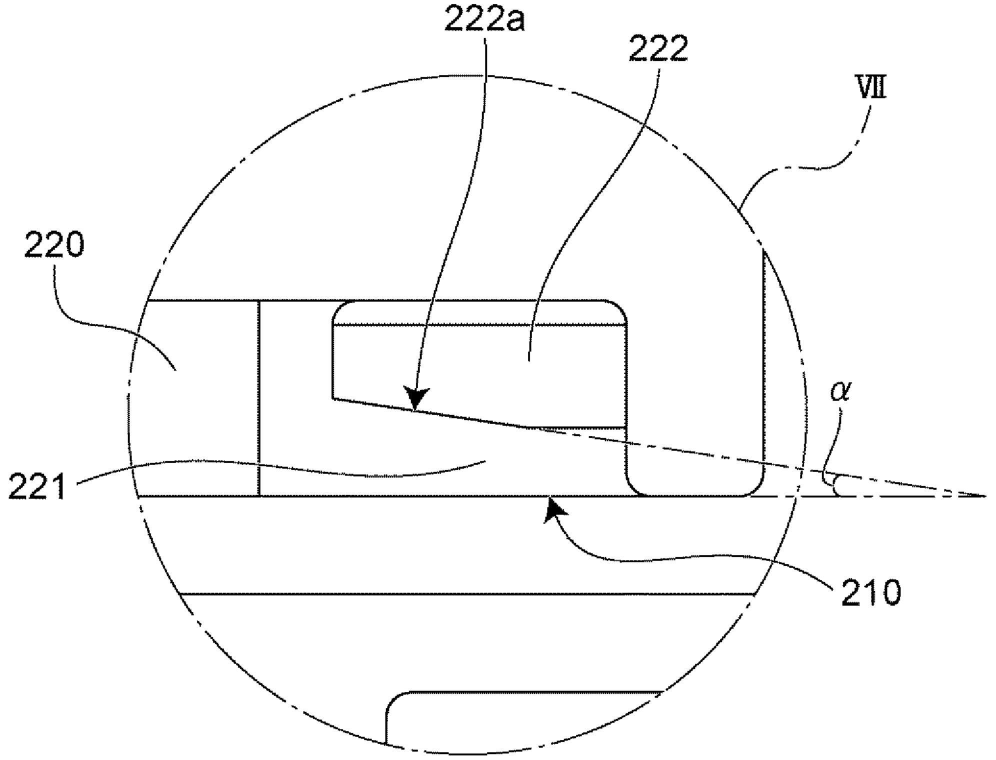
FIG. 12B schematically illustrates a partially-enlarged view of a portion VII of the housing shown in FIG. 12A.

FIG. 12A is a side view schematically showing the housing 1000 of the connector 2000, and FIG. 12B is a partially-enlarged view of a place in the outer housing 200 of FIG. 12A associated with press-fit engagement in the first clamping direction. The press-fit groove 221 may be provided in such a way as to form a groove along the front-back directions X in a side surface of the raised portion 220 so that the press-fit groove 221 corresponds to the press-fit protrusion 121 of the wire cover. In an embodiment, as shown in FIG. 12B, the press-fit groove 221 may be formed by a side protrusion 222 provided on the raised portion 220. The side protrusion 222 may be formed in such a way as to project or be raised from a side surface of the raised portion 220 that faces the side wall 120 of the wire cover 100 toward the side wall 120 of the wire cover 100. That is, the press-fit groove 221 may be formed by a lower surface 222*a* of the side protrusion 222 provided on a side surface of the raised portion 220 that faces the wire cover 100, the side surface of the raised portion 220, and the upper surface 210 of the outer housing 200.

Further, in the connector 2000, as shown in FIG. 12B, the press-fit groove 221 may be a tapered groove. In other words, an upper surface of the press-fit groove 221 may be inclined in such a way as to form an angle with the upper surface 210 of the outer housing 200. That is, the press-fit groove 221 may be a tapered groove that becomes gradually narrower in a direction parallel with the long sides of the connector 2000. More specifically, the upper surface 210 of the press-fit groove 221 may be an inclined surface that becomes gradually lower in the backward direction X" in such a way that the press-fit groove 221 becomes narrower in the backward direction X". In an embodiment, such a tapered press-fit groove 221 may be formed by the lower surface 222*a* of the side protrusion 222 having a tapered shape. This means that the lower surface 222*a* of the side protrusion 222 provided on the raised portion 220 has an inclined surface that becomes gradually lower in the backward direction X" of the connector 2000.

A posterior portion of the press-fit groove 221 (i.e. a portion of the press-fit groove 221 that is narrower in width dimension) may have a width dimension that is equal to, or slightly smaller than, the thickness of the press-fit protrusion 121 of the wire cover 100. That is, the press-fit groove 221 may have a shape that becomes gradually narrower to such a width dimension that the posterior portion makes close contact and interferes with the press-fit protrusion 121. In other words, the lower surface 222*a* of the side protrusion may have an inclined surface that becomes gradually lower in the backward direction in such a way that the engagement with the press-fit protrusion 121 gradually changes from a light press fit to a heavy press fit. The angle of inclination $\alpha$ (see FIG. 12B) that the lower surface 222*a* of the side protrusion forms with the upper surface 210 of the outer housing 200 in cross-sectional view is not limited to particular values, provided the posterior portion of the lower surface 222*a* interferes with the press-fit protrusion 121. For example, the angle of inclination $\alpha$ may be greater than or equal to 5 degrees and less than or equal to 45 degrees, or greater than or equal to 5 degrees and less than or equal to 35 degrees, e.g. 30 degrees. This shape causes the press-fit groove 221 and the press-fit protrusion 121 to be more suitably press-fit engaged with each other, so that backlash between the outer housing 200 and the wire cover 100 is suitably suppressed. It should be noted the shape of the surface that forms a taper is not limited to particular shapes, provided press-fit engagement with the press-fit protrusion 121 of the wire cover 100 is possible. For example, the surface that forms the tapered shape may be a flat surface, or may be a curved surface.

Figure 13:
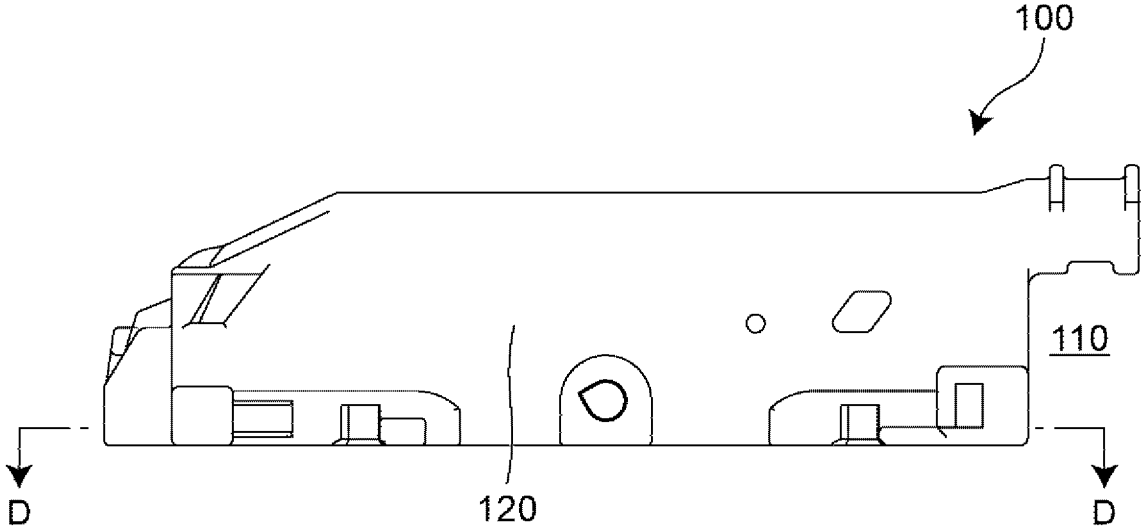
FIG. 13 is a side view schematically showing the wire cover of the connector of the present disclosure.
Figure 14A:
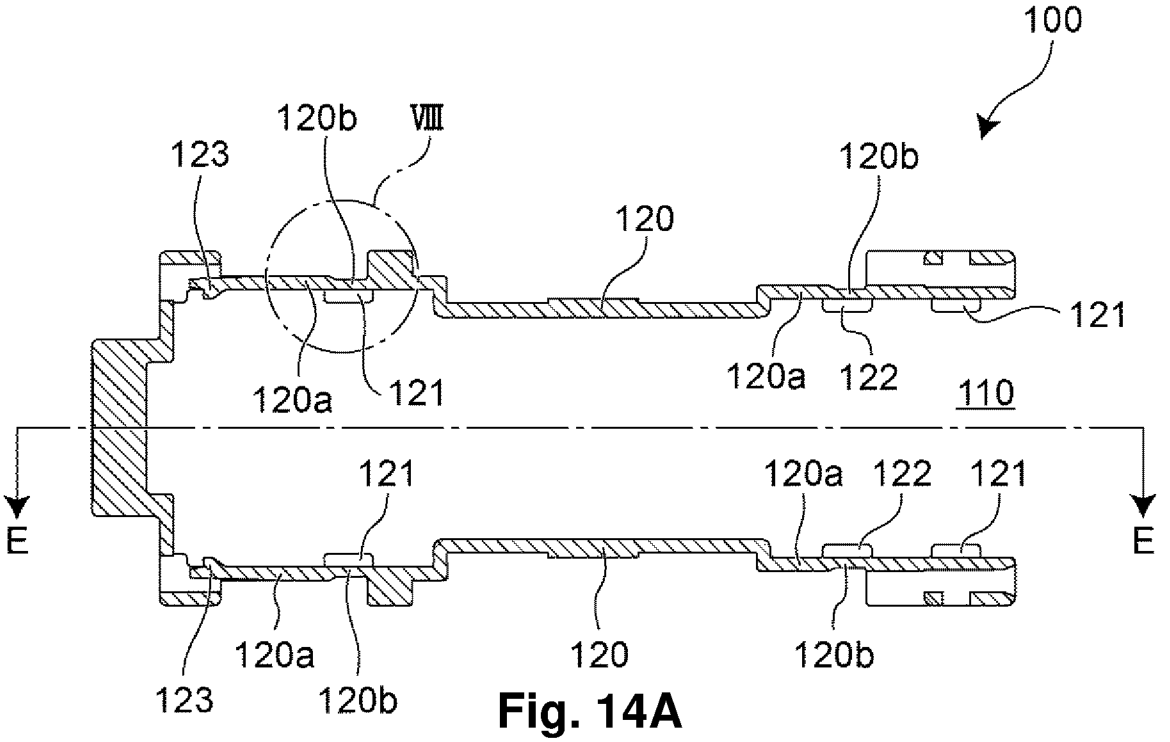
FIG. 14A is a top cross-sectional view of the wire cover as taken along arrow D-D in FIG. 13.
Figure 14B:
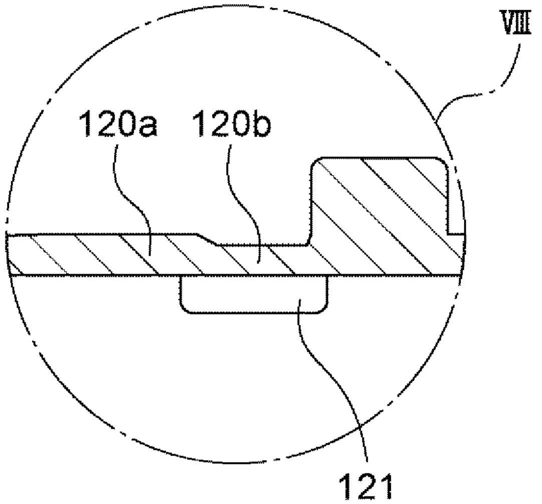
FIG. 14B is a partially-enlarged view showing a portion VIII of the wire cover shown in FIG. 14A.

FIG. 14A is a top cross-sectional view of the wire cover 100 shown in FIG. 13. Further, FIG. 14B illustrates an enlarged view of the press-fit protrusion 121 in the wire cover 100 of FIG. 14A. As illustrated, the press-fit protrusion 121 is provided in such a way as to project from the side wall 120 of the wire cover 100 toward the raised portion 220 of the outer housing 200. Further, the side wall 120 of the wire cover 100 on which the press-fit protrusion 121 is provided may be an inner wall of the wire cover 100. In other words, the press-fit protrusion 121, which corresponds to the press-fit groove 221 of the outer housing 200, may be provided inside the wire cover 100. That is, the raised portion 220 of the outer housing may be situated so as to face an inner side of the side wall 120 of the wire cover 100, and the press-fit engagement in the first clamping direction may be carried out inside the wire cover 100. With this structure, a space in the wire cover 100 in which to accommodate the electric wires of the mating connector can be made wider than in a case where the press-fit protrusion 121 is provided outside the wire cover 100. Accordingly, vibrations that may be transmitted from the electric wires to the terminal contact portions of the connector 2000 via the wire cover 100 are more suitably suppressed, so that the possibility of causing contact failures may be more suitably reduced.

Figure 15A:
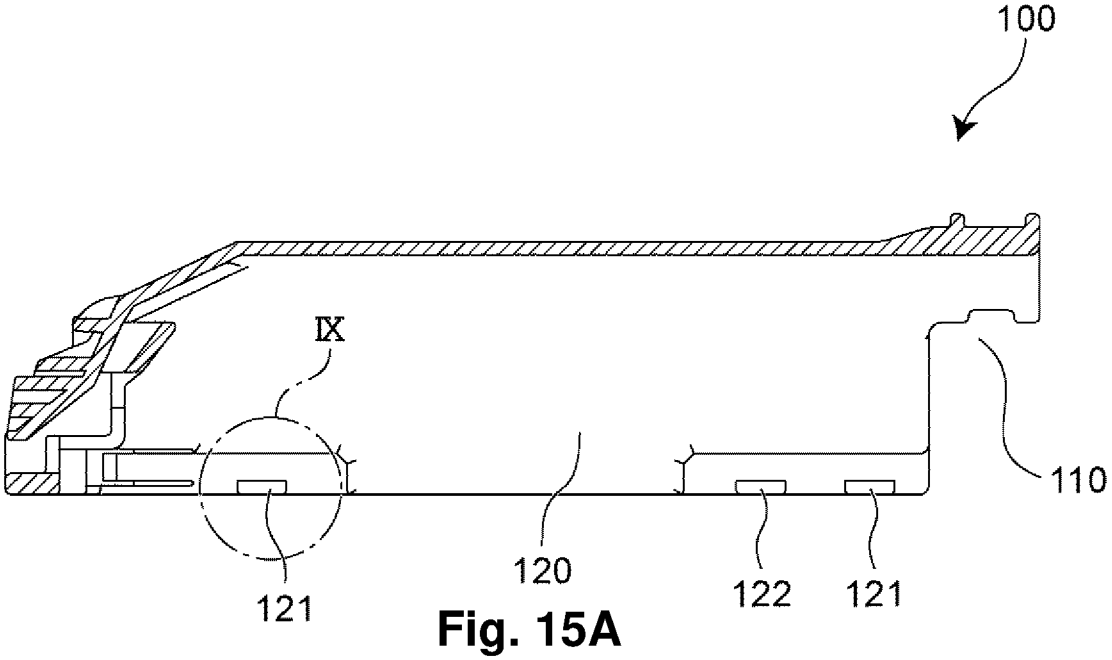
FIG. 15A is a side cross-sectional view of the wire cover as taken along arrow E-E in FIG. 14A.
Figure 15B:
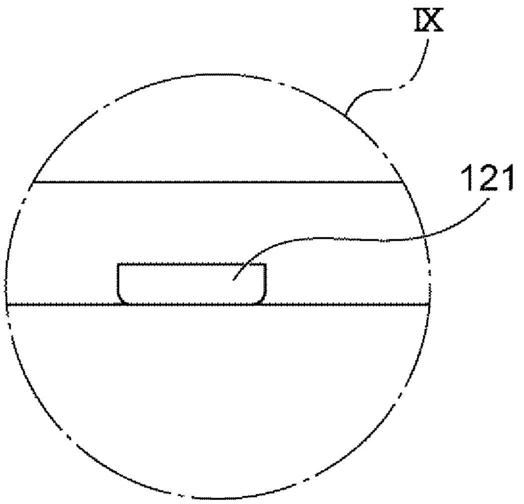
FIG. 15B is a partially-enlarged view showing a portion IX of the wire cover shown in FIG. 15A.

FIG. 15A is a side cross sectional view of the wire cover 100 shown in FIG. 13. Further, FIG. 15B illustrates an enlarged view of the press-fit protrusion 121 in the wire cover of FIG. 15A. As illustrated, the press-fit protrusion 121, which corresponds to the press-fit groove 221 of the outer housing 200, may be provided at the rim of the side wall 120 of the wire cover 100. More specifically, the press-fit protrusion 121 may be positioned at the rim of the wire cover 100 in such a way as to project from the side wall 120 toward either the inside or outside of the wire cover 100. The press-fit protrusion 121 provided at the rim of the side wall 120 of the wire cover 100 enables press-fit engagement with a larger engagement area during press-fit engagement with the press-fit groove 221 formed between the lower surface 222*a* of the side protrusion and the upper surface 210 of the outer housing 200. Accordingly, the aforementioned structure, which allows the press-fit protrusion 121 of the wire cover 100 to be more stably held, makes it possible to more suitably suppress backlash between the outer housing 200 and the wire cover 100.

Further, when mounted, for example, in an engine room of an automobile, a lever-type connector such as the connector of the present disclosure may be in general positioned in such an orientation that the wire cover 100 is on top as shown, for example, in FIG. 7. The inventors found that in such positioning, vibrations having components acting in up-down directions are strongest of vibrations that may be generated during operation. Accordingly, the connector 2000 may be affected most by vibrations applied in up-down directions. In the connector 2000, more suitable suppression of backlash caused by vibrations that are transmitted to the connector 2000 may be achieved by the aforementioned press-fit engagement of the wire cover 100 and the outer housing 200 by clamping in the up-down directions Z. Accordingly, the connector 2000 contributes to the prevention of unintended detachment of the wire cover 100 from the outer housing 200 and/or contact failures of the terminal contact portions.

Figure 8A:
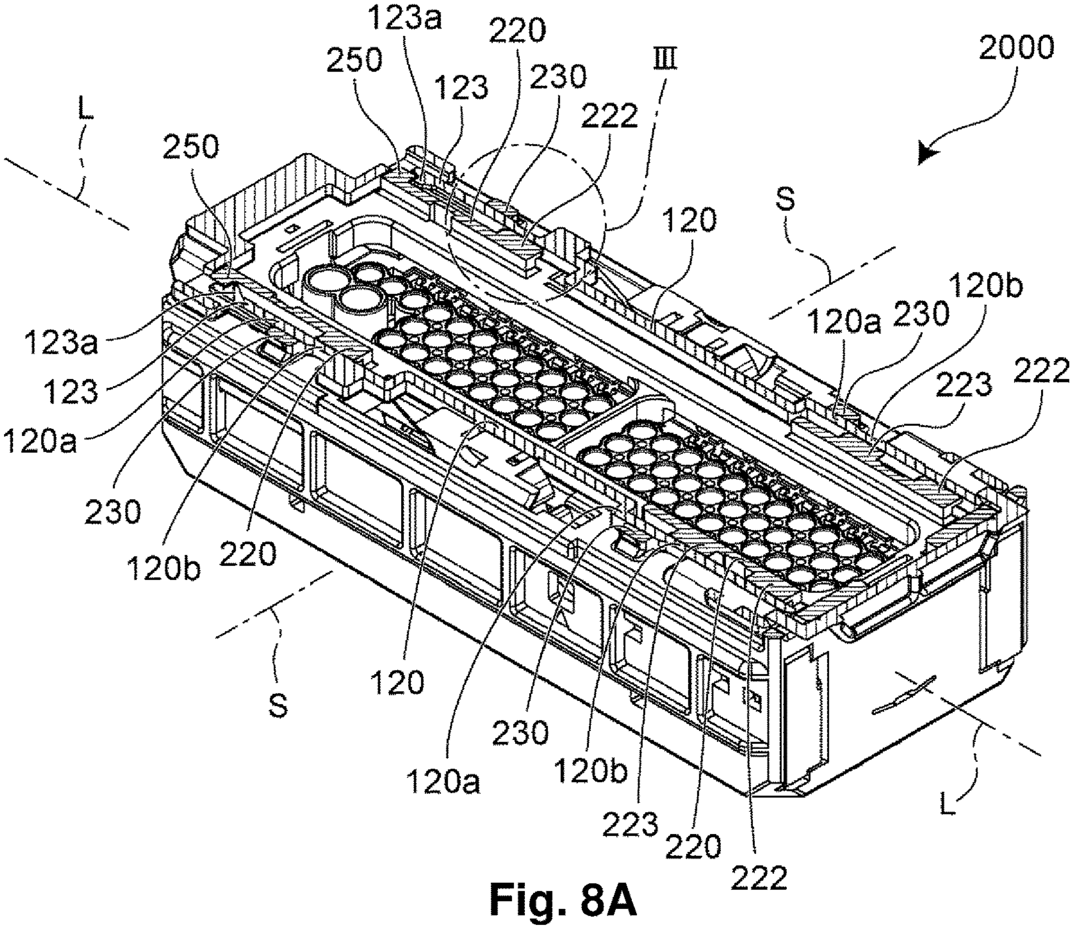
FIG. 8A is an isometric cross-sectional view of the connector as taken along arrow B-B in FIG. 7.
Figure 8B:
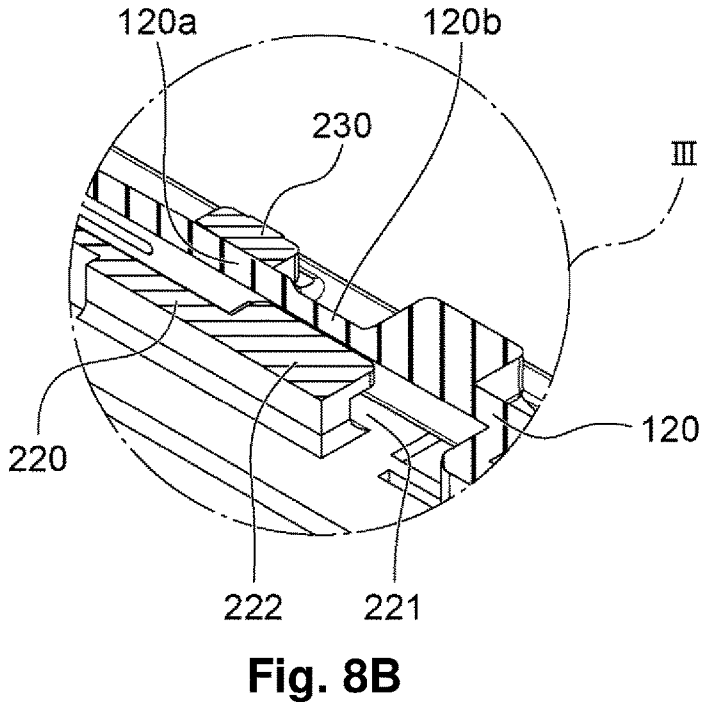
FIG. 8B is a partially-enlarged view showing a portion III of the connector shown in FIG. 8A.
Figure 9A:
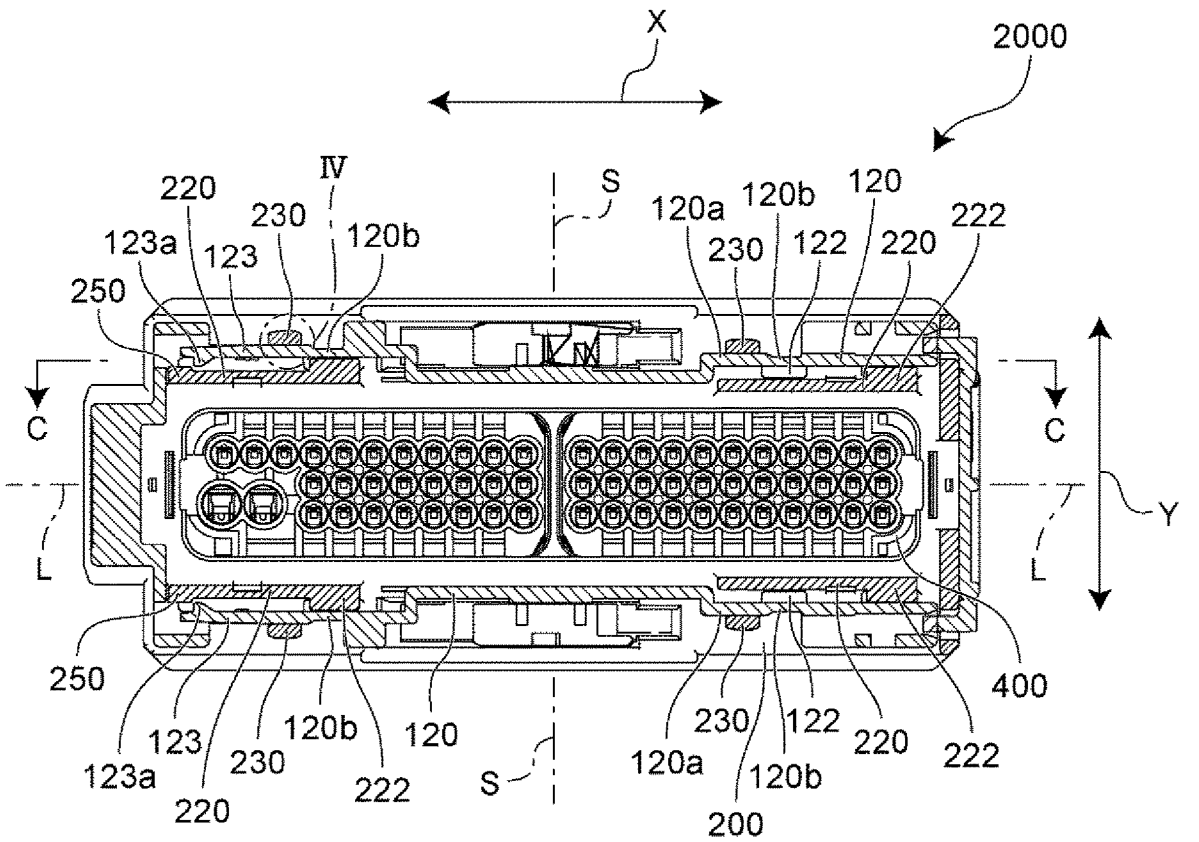
FIG. 9A is a top cross-sectional view of the connector as taken along arrow B-B in FIG. 7.
Figure 9B:
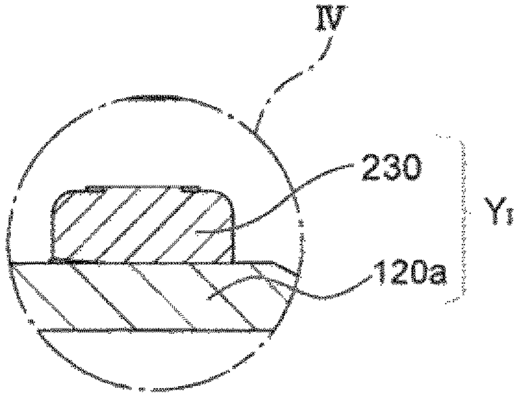
FIG. 9B is a partially-enlarged view showing a portion IV of the connector shown in FIG. 9A.

Further, in the connector 2000, the second clamping direction of the second press-fit engaging portion YI may be parallel with the right-left directions Y. The following describes the structure of the second press-fit engaging portion YI. FIG. 8A is an isometric cross sectional view of the connector of the present disclosure shown in FIG. 7, and FIG. 9A is a top cross sectional view. Furthermore, each of FIGS. 8B and 9B illustrates an enlarged view of the second press-fit engaging portion YI in a corresponding one of the connectors of FIGS. 8A and 9A. As illustrated, the press-fit engagement in the second clamping direction may be carried out by the side wall 120 of the wire cover interfering with the projecting portion 230 of the outer housing. That is, the wire cover 100 and the outer housing 200 may be press-fit engaged with each other by clamping of the side wall 120 of the wire cover and the projecting portion 230 of the outer housing. More specifically, the side wall 120 of the wire cover has a thick-walled portion 120*a* that is relatively thicker than the after-mentioned thin-walled portion 120*b*, and the thick-walled portion 120*a* may be engaged with a side surface 230*a* (see FIG. 11B) of the projecting portion 230 of the outer housing. In other words, the thick-walled portion 120*a* of the side wall 120 of the wire cover may be fixed by clamping by interfering with the side surface 230*a* of the projecting portion 230 of the outer housing. With such a structure, relative displacements of the outer housing 200 and the wire cover 100 in the right-left directions Y may be suitably restricted.

Figure 11B:
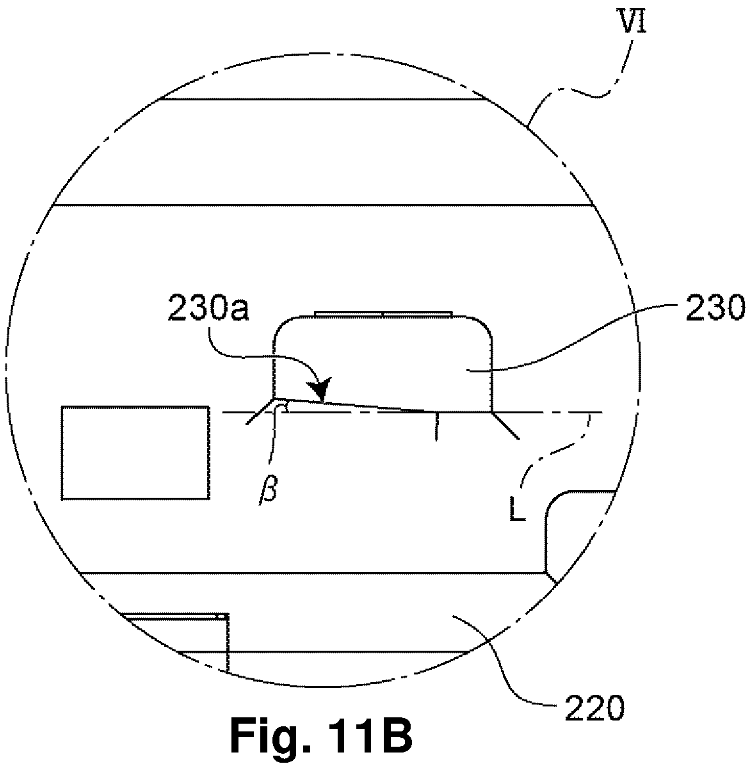
FIG. 11B schematically illustrates a partially-enlarged view of a portion VI of the housing shown in FIG. 11A.

FIG. 11A is a top view schematically showing the housing 1000 of the connector 2000, and FIG. 11B is a partially-enlarged view of a place in the outer housing 200 of the connector 2000 of FIG. 11A associated with press-fit engagement in the second clamping direction.

In the connector 2000 of the present disclosure, as shown in FIG. 11B, the side surface 230*a* of the projecting portion may be a tapered surface. That is, the side surface 230*a* of the projecting portion may be inclined in such a way as to form an angle β with respect to a long axis L. More specifically, the side surface 230*a* of the projecting portion, which interferes with the thick-walled portion 120*a* of the wire cover, may have a tapered surface that is gradually inclined in a direction parallel with the long sides of the connector. In other words, the tapered surface of the projecting portion 230 may be gradually inclined in such a way as to more greatly interfere with the thick-walled portion 120*a* in the posterior portion. This means that in the connector 2000 of the present disclosure, the side surface 230*a* of the projecting portion and the thick-walled portion 120*a* of the wire cover are press-fit engaged with each other in the posterior portion of the tapered surface of the side surface 230*a* of the projecting portion. That is, the side surface 230*a* of the projecting portion has an inclined surface that becomes gradually narrower toward the thick-walled portion in the backward direction X" in such a way that the press-fit engagement with the thick-walled portion 120*a* of the wire cover gradually changes from a light press fit to a heavy press fit. The angle of inclination β (see FIG. 11B) that the side surface 230*a* of the projecting portion forms with the long axis L in cross-sectional view is not limited to particular values, provided the posterior portion of the side surface 230*a* interferes with the side wall 120 of the wire cover. For example, the angle of inclination β may be greater than or equal to 5 degrees and less than or equal to 40 degrees, or greater than or equal to 5 degrees and less than or equal to 35 degrees, e.g. 25 degrees. This shape causes the side surface 230*a* of the projecting portion and the thick-walled portion 120*a* to be more suitably press-fit engaged with each other, so that backlash between the outer housing 200 and the wire cover 100 may be suitably suppressed. It should be noted the shape of the surface that forms a taper is not limited to particular shapes, provided press-fit engagement with the thick-walled portion 120*a* of the wire cover is possible. For example, the tapered surface may be a flat surface, or may be formed by a curved surface.

Furthermore, in the outer housing 200 assembled to the wire cover 100, the projecting portion 230 may be situated on one of an outer side and the inner side of the side wall 120 of the wire cover, and the raised portion 220 may be situated on the other of the outer side and the inner side of the side wall 120. That is, the projecting portion 230 and raised portion 220 of the outer housing may be positioned in such a way that the side wall 120 of the wire cover is in between the projecting portion 230 and the raised portion 220. In other words, the projecting portion 230 is provided in contact with either the inner side or the outer side of the side wall 120 of the wire cover, and the raised portion 220 may be provided in contact with the other side. In particular, it the projecting portion 230 may be positioned in such a way as to interfere with the outer side of the side wall 120 of the wire cover and the raised portion 220 be positioned inside the wire cover. In this structure, the raised portion 220 supports the wire cover 100 from inside against a press-fit from outside the wire cover 100 by the projecting portion 230, whereby relative displacements in the right-left directions Y may be more suitably suppressed.

In an embodiment shown in FIG. 8A, the raised portion 220 has the side protrusion 222 associated with press-fit engagement in the first clamping direction. In the aforementioned structure, the raised portion 220 and/or side protrusion 222 of the first press-fit engaging portion may contribute to the restriction of relative displacements in the second clamping direction. This means that the raised portion 220 and/or the side protrusion 222 may more suitably achieve press-fit engagement in the second clamping direction in cooperation with the projecting portion 230. The aforementioned structure, which more suitably suppresses backlash caused by vibrations applied from a plurality of directions, may contribute to the prevention of detachment of the wire cover from the outer housing and/or contact failures of the terminal contact portions.

Figure 16A:
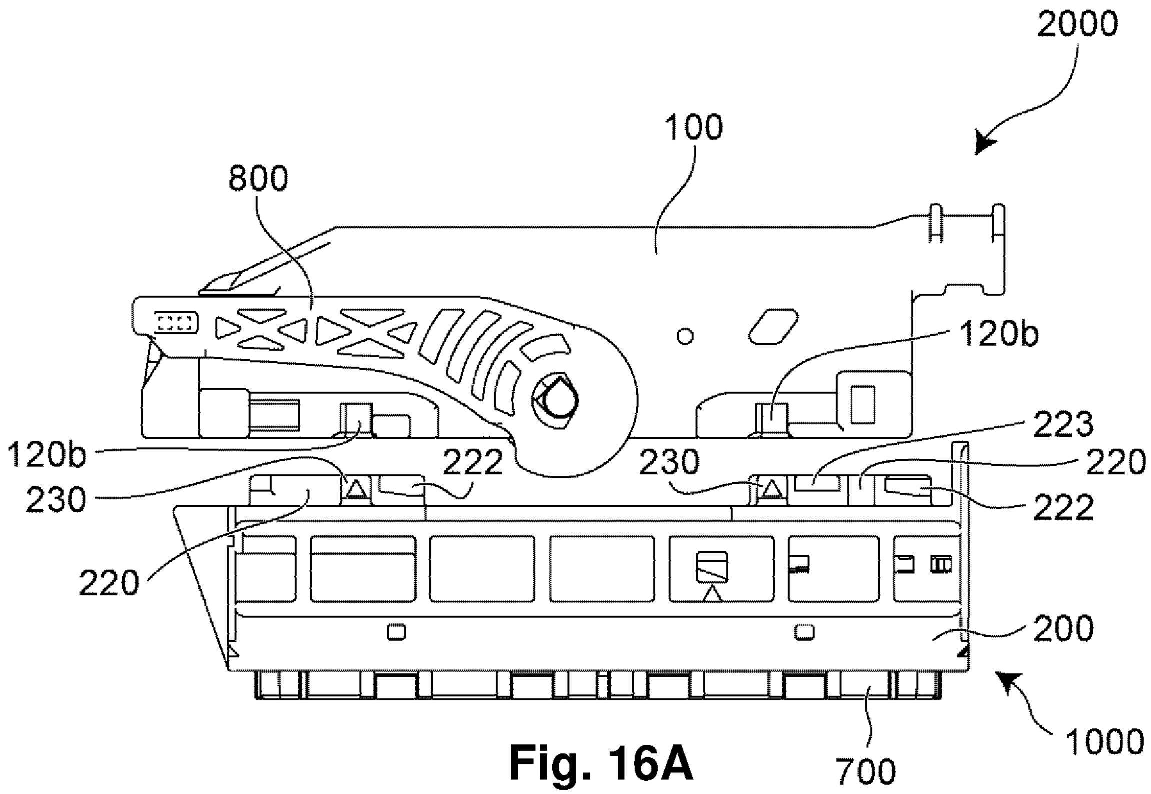
FIG. 16A is a side view schematically showing the connector of the present disclosure before assembling of the wire cover.
Figure 16B:
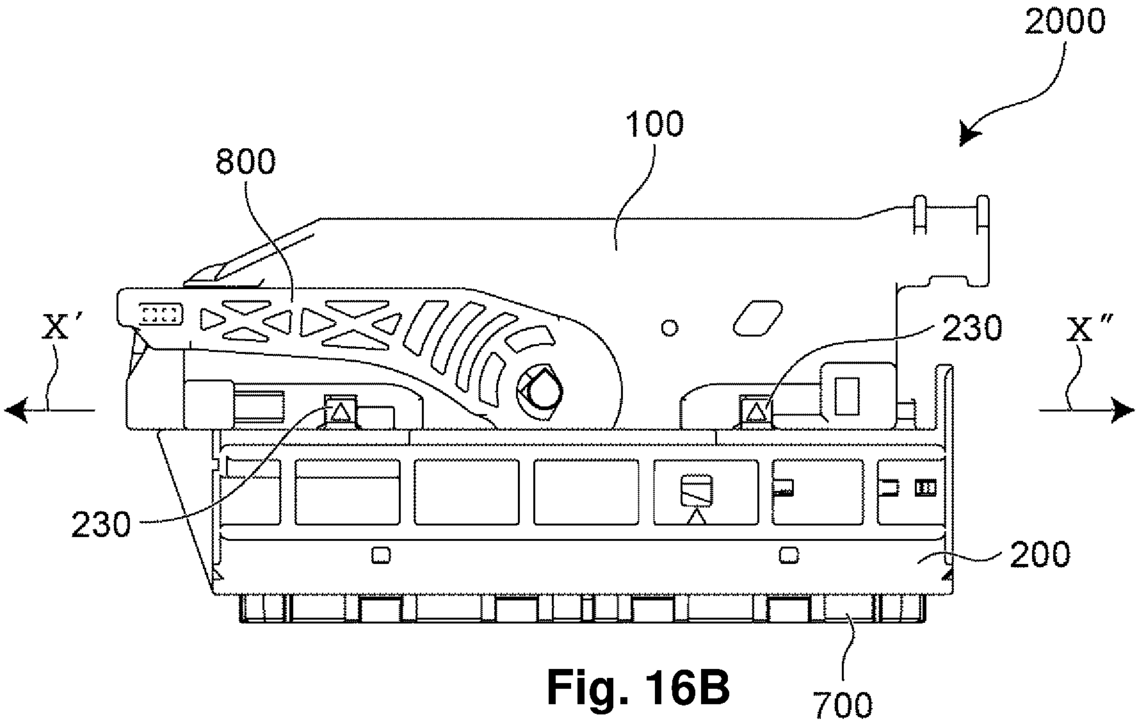
FIG. 16B is a side view schematically showing the connector of the present disclosure with the wire cover positioned in a temporary assembling position.
Figure 16C:
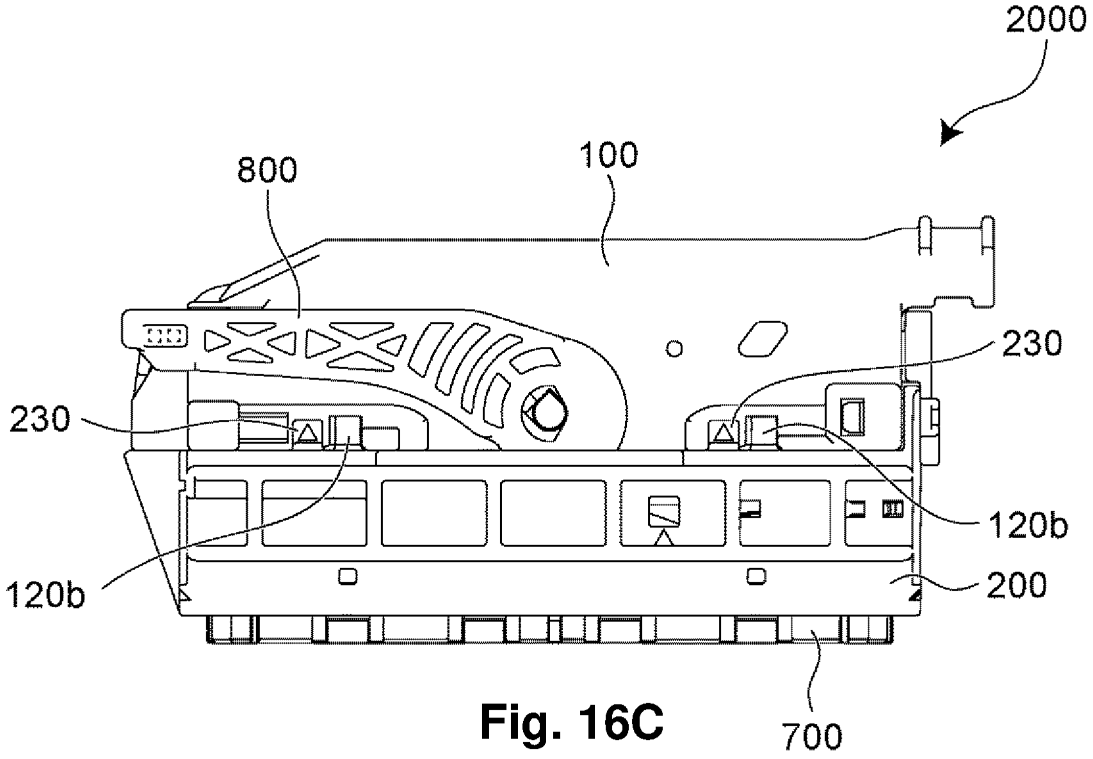
FIG. 16C is a side view schematically showing the connector of the present disclosure after assembling of the wire cover.

Next, a method for assembling a wire cover to a connector of the present disclosure is described. FIGS. 16A to 16C are schematic views sequentially showing aspects of assembling of the wire cover in the connector 2000. In the assembling, first, the wire cover 100 is positioned into a temporary assembling position from above the housing 1000 (see FIG. 16B). Press-fit engagement is carried out by bringing the wire cover 100 and the outer housing 200 into slide movement in the front-back directions X relative to each other from the temporary assembling position (see FIG. 16C). In other words, the assembling is completed by bringing the wire cover 100 into slide movement in the backward direction X" relative to the outer housing 200. This slide movement causes both the press-fit engagement in the first clamping direction and the press-fit engagement in the second clamping direction to be done. That is, by being brought into slide movement in the front-back directions X relative to each other, the wire cover 100 and the outer housing 200 attain the press-fit engagement by clamping in two types of direction that are orthogonal to each other. This assembling of the wire cover and the outer housing to each other by the press-fit engagement in directions orthogonal to each other, namely the first clamping direction and the second clamping direction, may make more remarkable the effect of suppressing backlash caused by vibrations applied from a plurality of directions. Accordingly, the connector of the present disclosure thus assembled may more suitably prevent detachment of the wire cover from the outer housing and/or contact failures of the terminal contact portions.

More specifically, in the assembling of the wire cover in the connector of the present disclosure, the press-fit protrusion 121 of the wire cover is positioned adjacent to the press-fit groove 221 of the outer housing in the frontward direction X' in the temporary assembling position shown in FIG. 16B. Further, in so doing, the projecting portion 230 of the outer housing is positioned so as to face the aftermentioned thin-walled portion 120*b* of the wire cover. Next, the wire cover 100 is brought into slide movement in the backward direction X". This slide movement causes the press-fit protrusion 121 of the wire cover to be plugged into the press-fit groove 221 of the outer housing. Furthermore, the side surface 230*a* of the projecting portion of the outer housing moves toward the thick-walled portion 120*a* of the wire cover along the slide movement and interferes with the thick-walled portion 120*a*. Then, both the press-fit engagement between the press-fit groove 221 and the press-fit protrusion 121 and the press-fit engagement between the projecting portion 230 and the thick-walled portion 120*a* are done, whereby the assembling is completed. By thus doing both the press-fit engagement by clamping in the up-down directions Z and the press-fit engagement by clamping in the right-left directions Y, the connector of the present disclosure allows the wire cover 100 and the outer housing 200 to be more firmly fixed. That is, the press-fit engagement based on the two types of clamping direction that are orthogonal to each other makes it possible to perform firmer assembling and, by extension, brings about a remarkable effect in suppressing backlash under conditions of high vibrations applied from a plurality of directions, so that detachment of the wire cover from the outer housing and/or contact failures of the terminal contact portions may be more suitably prevented.

Further, with such assembling, the connector 2000 is also superior in operability of removal of the wire cover. A lever-type connector mounted, for example, in an automobile may be replaced for maintenance. In replacing the connector, an operator needs to manually remove the wire cover from the outer housing. A conventional lever-type connector requires an operator to excessively spread the lock portion (catch portion) in removing the wire cover from the housing, posing a risk of damaging the housing and/or the wire cover. In the connector 2000 of the present disclosure, on the other hand, the removal of the wire cover is carried out by bringing the wire cover and the outer housing into slide movement relative to each other, so that there is no need to deform the wire cover and/or the outer housing. Accordingly, the connector of the present disclosure prevents the occurrence of deformation and/or damage due to an operator excessively deforming the wire cover and/or the outer housing in removing the wire cover. Furthermore, since removal is enabled by slide movement alone, it takes a much lighter burden and much shorter operating hours for an operator to perform, for example, the operation of replacing connectors.

In the assembling of the wire cover in the connector of the present disclosure, the wire cover and the outer housing may have a structure to lead the wire cover into the temporary assembling position. Specifically, the wire cover 100 may have the locating protrusion 122 on the side wall 122 (see FIG. 3B), and the outer housing 200 may have a located protrusion 223 provided so as to correspond to the locating protrusion 122 (see FIG. 5B). In an embodiment, the located protrusion 223 of the outer housing is provided adjacent to the side protrusion 222, which forms the press-fit groove 221 of the raised portion 220, in the frontward direction X' so as to project in the same direction as the side protrusion 222 from the side surface of the raised portion 220. The locating protrusion 122 of the wire cover is provided adjacent to the press-fit protrusion 121 in the frontward direction X' so as to project in the same direction as the press-fit protrusion 121 from the side surface 120 of the wire cover. Further, the locating protrusion 122 is situated in such a way that in positioning into the temporary assembling position, the located protrusion 223 fits between the locating protrusion 122 and the press-fit protrusion 121. In other words, the locating protrusion 122 and the press-fit protrusion 121 are adjacent to each other with a distance therebetween so that in placing the wire cover 100 into the temporary assembling position, the located protrusion 223 passes through the space between the locating protrusion 122 and the press-fit protrusion 121. Under such a structure, in the assembling of the wire cover 100, the wire cover 100 is led into the temporary assembling position by the locating protrusion 122 and the located protrusion 223 being combined in such a way as to fit with each other. More specifically, the locating of the wire cover 100 into the temporary assembling position is performed by combining the wire cover 100 and the outer housing 200 in such a way that the located protrusion 223 fits between the locating protrusion 122 and the press-fit protrusion 121. After that, in bringing the wire cover 100 and the outer housing 200 into slide movement relative to each other for press-fit engagement, the locating protrusion 122 moves in the backward direction X" in such a way as to pass through the space between the located protrusion 223 and the upper surface 210 of the outer housing. Such a structure makes it possible to more surely position the wire cover into the temporary assembling position in assembling the wire cover. Accordingly, the aforementioned locating structure may contribute to the prevention of false engagement of the wire cover and further improvement in operability of the assembling operation.

Furthermore, the raised portion 220 of the outer housing may be positioned so as to face the locating protrusion 122 of the wire cover in the temporary assembling position. More specifically, as shown in FIG. 9A, the raised portion 220 may extend in a direction parallel with the long sides so as to face the locating protrusion 122 in the temporary assembling position. This structure may bring the locating protrusion 122 into slide movement along the raised portion 220 during press-fit engagement and cause the wire cover to be suitably guided into a position where the press-fit engagement is completed. Accordingly, the aforementioned structure more suitably prevents false engagement of the wire cover, thus bring about an effect of improving operating efficiency in the assembling operation.

Further, as shown in FIG. 14B, the wire cover 100 also has a thin-walled portion **120*b* of the side wall 120 that is relatively thinner than the aforementioned thick-walled portion 120*a*. More specifically, the thin-walled portion 120*b* may be relatively thin so as to form a recess in which the tapered surface of the projection portion 230 is accommodated in the temporary assembling position. Further, the thin-walled portion 120*b* may be adjacent to the thick-walled portion 120*a*, which interferes with the projecting portion 230 of the outer housing in the press-fit engaging portion of the second clamping direction, in a direction parallel with the long sides of the connector 2000. More specifically, the thin-walled portion 120*b* may be positioned adjacent to the thick-walled portion 120*a* in the backward direction X". In an embodiment, the tapered surface of the projecting portion 230 is gradually inclined toward the thin-walled portion 120*b*, which is adjacent to the thick-walled portion 120*a*. The thin-walled portion 120*b* may form a recess in such a way as to accommodate the tapered surface of the projecting portion 230 in the temporary assembling position. This structure makes it possible to, in the temporary assembling, position the tapered surface of the projecting portion 230 without causing the tapered surface to interfere with the side wall 120 of the wire cover. Furthermore, in the subsequent press-fit based on slide movement too, this brings about an effect of making it easy for the projecting portion 230 to more suitably make slide movement from the thin-walled portion 120*b* toward the thick-walled portion 120*a***.

Further, in the connector 2000, the two types of press-fit engaging portion that have clamping directions orthogonal to each other may be adjacent to each other to form a pair. In other words, the first press-fit engaging portion of the first clamping direction and the second press-fit engaging portion of the second clamping direction may be positioned adjacent to each other in a direction parallel with the long sides. Specifically, as shown in FIG. 8A, the first press-fit engaging portion ZI may be provided adjacent to the second press-fit engaging portion YI in the backward direction X". In such a structure, the raised portion 220 according to the first press-fit engaging portion ZI and/or the side protrusion 222 provided on the raised portion 220 may also serve to support the wire cover 100 during the press-fit engagement in the second clamping direction. Accordingly, positioning the press-fit engaging portion of the first clamping direction and the press-fit engaging portion of the second clamping direction adjacent to each other may help more suitably suppress backlash of the wire cover.

Furthermore, in a case where the two types of press-fit engaging portion that have clamping directions orthogonal to each other are positioned adjacent to each other, the press-fit protrusion 121 or the locating protrusion 122 of the wire cover may be provided on the thin-walled portion 120*b*. More specifically, the locating protrusion 122 may be provided on the thin-walled portion 120*b* in such a way as to project from the side surface 120 opposite to a side facing the projecting portion 230 of the outer housing (see FIG. 14B). In an embodiment, as shown in FIG. 14A, the press-fit protrusion 121 or the locating protrusion 122 may be positioned on the thin-walled portion 120*b*, which is formed to have a recess on an outer side of the wire cover 100, in such a way as to project toward the inside of the wire cover 100. The aforementioned structure makes it possible to further improve the strength of the thin-walled portion 120*b* of the wire cover.

In the connector 2000, one or more pairs consisting of a first press-fit engaging portion and a second press-fit engaging portion that are adjacent to each other may be provided. For example, at least two, at least three, at least four, or more such pairs may be provided. Although the number of pairs of press-fit engaging portions is not limited to particular values, a larger number of press-fit engaging portions may cause the wire cover and the outer housing to be more firmly assembled to each other. However, a larger number of press-fit engaging portions lead to a heavier load, increasing the burden on an operator during the assembling operation and the risk of damage to the wire cover and/or the outer housing. Accordingly, with emphasis on the strength of assembling and the load of assembling, the number of pairs of press-fit engaging portions may be larger than or equal to 2 and smaller than or equal to 6, or larger than or equal to 2 and smaller than or equal to 4.

A pair of press-fit engaging portions may be provided in an anterior region and/or a posterior region of the connector. In other words, the wire cover may be assembled by a pair of press-fit engaging portions provided in at least either the anterior or posterior region of the connector. With more emphasis on handling vibrations that may be transmitted from the electric wires, a pair of press-fit engaging portions may be provided in the posterior region of the connector, as the electric wires are led out from the posterior region. In an embodiment, at least one pair of press-fit engaging portions be provided in each of the anterior and posterior regions of the connector. In another embodiment, the connector may have four pairs of press-fit engaging portions, and the four pairs may be positioned symmetrically with one another. In particular, the four pairs may be situated symmetrically with one another in a top view of the connector. Although FIG. 9A is a cross sectional view of the connector of the present disclosure, the term “top view” here is equivalent to a top view of the connector of the present disclosure as taken along the downward direction Z". As shown in FIG. 9A, the four pairs may be positioned in positions symmetrical with one another with respect to the long axis L and the short axis S. The aforementioned structure causes the load on the press-fit engaging portions to be effectively dispersed, so that backlash caused by vibrations applied from a plurality of directions may be more suitably suppressed.

In the connector of the present disclosure, the wire cover and the outer housing may contain an insulating resin material. The wire cover and the outer housing may contain, but are not limited to, at least one type of thermosetting resin selected from the group consisting of, for example, epoxy resin, phenol resin, silicone resin, and unsaturated polyester resin. Further, the wire cover and the outer housing may contain different resin materials.

In general, in a lever-type connector such as the connector of the present disclosure, the wire cover is the most easily replaceable component. Therefore, the outer housing may be formed with relatively higher strength than the wire cover so that wear of the press-fit engaging portions by use of the connector 2000 occurs preferentially in the wire cover, which is more easily replaceable. In other words, the outer housing may have higher rigidity than the wire cover. For example, the outer housing may be formed of a material that is relatively higher in rigidity than the wire cover. Alternatively, the outer housing may have relatively high rigidity by being formed with a relatively greater thickness than the wire cover. In such a case where the wire cover is lower in rigidity than the outer housing, the wire cover may preferentially wear, for example, due to repetition of the removing operation and/or use under high-vibrational conditions. This makes it possible to relatively extend the effective life of the outer housing. Meanwhile, since the wire cover is comparatively easily replaced even when it wears, the operating efficiency in the maintenance or repair of the connector may be improved.

Further, the connector 2000 may have a catch portion 123*a* for preventing the movement of the wire cover 100 and the outer housing 200 in the front-back directions X after completion of the assembling (see FIG. 8A). More specifically, the wire cover 100 may be fixed to the outer housing 200 by the catch portion 123*a* so that relative displacements of the wire cover 100 in the front-back directions X, which are directions of slide movement, are prevented after the wire cover 100 has been press-fit engaged by slide movement. As shown in FIG. 8A, the catch portion 123*a* may be formed at the tip of a cantilever 123 provided on the side surface 120 of the anterior region of the wire cover 100. Bringing the wire cover 100 into slide movement from the temporary assembling position in the backward direction X" in assembling the wire cover 100 causes the catch portion 123*a* to be caught on a caught portion 250 of the raised portion 220 provided in the front of the outer housing 200. Such a structure regulates relative displacements of the wire cover 100 in the front-back directions X, making it possible to prevent unintended detachment of the wire cover by vibrations or other movements.

The engagement between the wire cover 100 and the outer housing 200 by the catch portion 123*a* is carried out by the cantilever 123 slightly bending in the right-left directions Y during slide movement. Accordingly, the press-fit engaging portion of the second clamping direction of clamping in the right-left directions Y be provided in such a position as not to inhibit the function of the cantilever 123. In other words, the press-fit engaging portion of the second clamping direction may be positioned around the vicinity of the tip of the cantilever 123, which has the catch portion 123*a*. Such a structure makes it possible to more suitably assemble the wire cover 100 and the outer housing 200 to each other without interfering with the motion of the cantilever 123 during slide movement. Furthermore, the aforementioned structure regulates relative displacements of the wire cover and the outer housing in the up-down directions Z, the right-left directions Y, and the front-back directions X. This brings about a more remarkable effect of suppressing backlash caused by vibrations applied from a plurality of directions, so that detachment of the wire cover from the outer housing and/or contact failures of the terminal contact portions may be further suitably prevented.

Although the present disclosure has been described above, the foregoing description has merely illustrated typical examples that fall within the range of application of the present disclosure. The connector of the present disclosure does not need to include a force-multiplication mechanism such as a lever. Further, the connector of the present disclosure does not need to be a waterproof connector including a seal element. Other than the above components, components named in the foregoing embodiment may be chosen and adopted, or may be replaced as appropriate by other components, provided such components do not depart from the scope of the present disclosure.

A connector of the present disclosure including a wire cover and an outer housing can be suitably utilized in various technical fields requiring electrical connections.

What is claimed is:

1. A connector, comprising:

an outer housing;

a wire cover assembled to the outer housing;

a first press-fit engaging portion that engages the outer housing and the wire cover with each other by clamping in a first clamping direction, in the first press-fit engaging portion, the wire cover has a press-fit protrusion on a side surface and the outer housing has a press-fit groove in a raised portion on an upper surface, the press-fit protrusion is engaged with the press-fit groove, the raised portion provided on a periphery of the upper surface along a direction parallel with a pair of long sides of the outer housing; and a second press-fit engaging portion that engages the outer housing and the wire cover with each other by clamping in a second clamping direction that intersects the first clamping direction.

2. The connector of claim 1, wherein the press-fit groove is a tapered groove.

3. The connector of claim 2, wherein the tapered groove becomes gradually narrower in a direction parallel with a pair of long sides of the connector.

4. The connector of claim 1, wherein the side surface is part of an inner wall of the wire cover.

5. The connector of claim 1, wherein in the second press-fit engaging portion, the outer housing has a projecting portion on an upper surface, and a side wall of the wire cover and a side wall of the projecting portion engage with each other.

6. The connector of claim 5, wherein the side wall of the projecting portion has a tapered surface.

7. The connector of claim 6, wherein the tapered surface is gradually inclined in a direction parallel with a pair of long sides of the connector.

8. The connector of claim 1, wherein in the second press-fit engaging portion, the outer housing has a projecting portion on an upper surface, and a side wall of the wire cover and a side wall of the projecting portion engage with each other.

9. The connector of claim 8, wherein the projecting portion is on one of an outer side and an inner side of the side wall of the wire cover, and the raised portion is on the other of the outer side and the inner side of the side wall.

10. The connector of claim 8, wherein the wire cover and the outer housing are assembled to each other by bringing the wire cover and the outer housing into a sliding movement relative to each other.

11. The connector of claim 10, wherein the sliding movement causes both the engagement between the press-fit protrusion and the press-fit groove and the engagement between the side wall of the wire cover and the side wall of the projecting portion.

12. The connector of claim 11, wherein the wire cover has a locating protrusion on the side wall and the outer housing has a located protrusion on the raised portion, the locating protrusion and the located protrusion fit with each other in combining the wire cover and the outer housing.

13. The connector of claim 5, wherein the side wall of the wire cover has a thick-walled portion and a thin-walled portion thinner than the thick-walled portion.

14. The connector of claim 13, wherein the thick-walled portion and the thin-walled portion are adjacent to each other in a direction parallel with a pair of long sides of the connector.

15. The connector of claim 1, wherein the first press-fit engaging portion and the second press-fit engaging portion are adjacent to each other.

16. The connector of claim 15, wherein four pairs of the first press-fit engaging portion and the second press-fit engaging portion adjacent to each other are positioned symmetrically.

17. The connector of claim 1, wherein the outer housing has a higher rigidity than the wire cover.

18. A connector, comprising:

an outer housing;

a wire cover assembled to the outer housing;

a first press-fit engaging portion that engages the outer housing and the wire cover with each other by clamping in a first clamping direction; and a second press-fit engaging portion that engages the outer housing and the wire cover with each other by clamping in a second clamping direction that intersects the first clamping direction, in the second press-fit engaging portion, the outer housing has a projecting portion on an upper surface, and a side wall of the wire cover and a side wall of the projecting portion engage with each other.

19. A connector, comprising:

an outer housing;

a wire cover assembled to the outer housing;

a first press-fit engaging portion that slidably engages the outer housing and the wire cover with each other by clamping in a first clamping direction as the wire cover is slidably engaged with the outer housing in a sliding direction; and a second press-fit engaging portion that slidably engages the outer housing and the wire cover with each other by clamping in a second clamping direction that intersects the first clamping direction as the wire cover is slidably engaged with the outer housing in the clamping direction, the first clamping direction and the second clamping direction are transverse to the sliding direction.

20. The connector of claim 19, wherein the sliding direction, the first clamping direction and the second clamping direction are orthogonal to each other.

* * * * *